US008865120B2

(12) United States Patent
Wen et al.

(10) Patent No.: US 8,865,120 B2
(45) Date of Patent: Oct. 21, 2014

(54) PROCESS FOR THE PRODUCTION OF METAL DOPED ZEOLITES AND ZEOTYPES AND APPLICATION OF SAME TO THE CATALYTIC REMEDIATION OF NITROGEN OXIDES

(75) Inventors: Fei Wen, Kahl am Main (DE); Barry W. L. Southward, Bristol, PA (US); Liesbet Jongen, Waechtersbach (DE); Alexander Hofmann, Hanau (DE); Daniel Herein, Frankfurt (DE)

(73) Assignee: Umicore AG & Co., KG, Hanau-Wolfgang (DE)

( * ) Notice: Subject to any disclaimer, the term of this patent is extended or adjusted under 35 U.S.C. 154(b) by 0 days.

(21) Appl. No.: 13/992,025

(22) PCT Filed: Dec. 8, 2011

(86) PCT No.: PCT/EP2011/072190
§ 371 (c)(1),
(2), (4) Date: Jun. 6, 2013

(87) PCT Pub. No.: WO2012/076648
PCT Pub. Date: Jun. 14, 2012

(65) Prior Publication Data
US 2013/0251611 A1    Sep. 26, 2013

(30) Foreign Application Priority Data
Dec. 11, 2010 (EP) .................................... 10015547

(51) Int. Cl.
*B01J 29/85* (2006.01)
*B01J 29/46* (2006.01)
*B01J 29/70* (2006.01)
*B01J 29/00* (2006.01)
*B01D 53/56* (2006.01)
*B01D 53/94* (2006.01)
*B01J 35/04* (2006.01)
*B01J 37/02* (2006.01)
*B01J 37/04* (2006.01)
*B01J 29/76* (2006.01)

(52) U.S. Cl.
CPC ............ *B01J 29/85* (2013.01); *B01D 53/9418* (2013.01); *B01D 2255/20738* (2013.01); *B01D 2255/20761* (2013.01); *B01J 29/46* (2013.01); *B01D 2255/104* (2013.01); *B01D 2255/9202* (2013.01); *B01D 2255/50* (2013.01); *B01D 53/9413* (2013.01); *B01D 2258/012* (2013.01); *B01J 35/04* (2013.01); *B01D 2251/2062* (2013.01); *B01J 29/7007* (2013.01); *B01D 2255/2065* (2013.01); *B01D 2255/9207* (2013.01); *B01J 37/0238* (2013.01); *B01D 2255/20746* (2013.01); *B01J 37/04* (2013.01); *B01J 29/7615* (2013.01); *B01D 2251/2067* (2013.01)

USPC ..... 423/700; 423/713; 423/213.2; 423/239.2; 502/60; 502/64; 502/65; 502/66; 502/74; 502/79; 502/304; 502/338; 502/345; 502/344; 502/300

(58) Field of Classification Search
USPC ........ 423/700, 713, 213.2, 239.2; 502/60, 64, 502/65, 66, 74, 79, 304, 338, 345, 344, 300
See application file for complete search history.

(56) References Cited

U.S. PATENT DOCUMENTS

| | | | | |
|---|---|---|---|---|
| 4,323,481 A | * | 4/1982 | Kaduk | ............................. 502/74 |
| 4,961,917 A | | 10/1990 | Byrne | |
| 5,116,586 A | | 5/1992 | Baacke et al. | |
| 5,270,024 A | | 12/1993 | Kasahara et al. | |
| 5,271,913 A | | 12/1993 | Iida et al. | |
| 5,434,114 A | | 7/1995 | Weitkamp et al. | |
| 5,516,497 A | | 5/1996 | Speronello et al. | |
| 5,520,895 A | * | 5/1996 | Sharma et al. | ............. 423/239.2 |
| 5,545,784 A | | 8/1996 | Weitkamp et al. | |
| 5,776,423 A | | 7/1998 | Feeley et al. | |
| 5,908,806 A | | 6/1999 | Kharas | |
| 6,043,177 A | | 3/2000 | Falconer et al. | |
| 6,221,324 B1 | | 4/2001 | Coq et al. | |
| 7,049,261 B2 | | 5/2006 | Nam et al. | |
| 7,282,573 B2 | | 10/2007 | Chaudhuri et al. | |

(Continued)

FOREIGN PATENT DOCUMENTS

EP    0 749 781 A2    12/1996
EP    0 955 080 A1    11/1999

(Continued)

OTHER PUBLICATIONS

Mohamed Mokhtar Mohamed[a], N. A. Eissa[b], "Characterization of intrazeolitic $Fe^{3+}$ prepared by chemical vapor deposition of $[(C_5H_5)Fe(Co)_2]_2$ inside NaY and FSM-16 zeolites and their catalytic activities towards phenol hydroxylation", Materials Research Bulletin, 2003, vol. 38, pp. 1993-2007.

Hellmut G. Karge and Hermann K. Beyer, "Introduction of Cations into Zeolites by Solid-State Reaction", Zeolite Chemistry and Catalysis, 1991Elsevier Science Publishers B,V., Amsterdam, pp. 43-64.

Freek Kapteijn et al., "Kinetic Analysis of the Decomposition of Nitrous Oxide over ZSM-5 Catalysts", Journal of Catalysis, 1997, vol. 167, pp. 256-265.

(Continued)

Primary Examiner — Timothy Vanoy
(74) Attorney, Agent, or Firm — Smith, Gambrell & Russell, LLP

(57) ABSTRACT

The present invention is directed to a process for the production of ion-exchanged (metal-doped, metal-exchanged) Zeolites and Zeotypes, In particular, the method applied uses a sublimation step to incorporate the ion within the channels of the Zeolitic material. Hence, according to this dry procedure no solvent is involved which obviates certain drawbacks connected with wet exchange processes known in the art.

20 Claims, 17 Drawing Sheets

(56) References Cited

U.S. PATENT DOCUMENTS

| | | |
|---|---|---|
| 7,601,662 B2 | 10/2009 | Bull et al. |
| 8,404,203 B2 | 3/2013 | Bull et al. |
| 2002/0016252 A1 | 2/2002 | Takahashi et al. |
| 2008/0292519 A1* | 11/2008 | Caudle et al. ............... 423/237 |
| 2009/0196812 A1 | 8/2009 | Bull et al. |
| 2010/0075834 A1 | 3/2010 | Hurgobin et al. |
| 2011/0020204 A1 | 1/2011 | Bull et al. |
| 2012/0301378 A1 | 11/2012 | Fedeyko et al. |
| 2012/0301379 A1 | 11/2012 | Fedeyko et al. |
| 2012/0301380 A1 | 11/2012 | Fedeyko et al. |
| 2012/0301381 A1 | 11/2012 | Fedeyko et al. |
| 2013/0224082 A1* | 8/2013 | Narula et al. ............... 422/180 |

FOREIGN PATENT DOCUMENTS

| | | |
|---|---|---|
| EP | 1 142 833 A1 | 10/2001 |
| WO | 2004/056737 A1 | 7/2004 |
| WO | 2008/009453 A2 | 1/2008 |
| WO | 2008/106519 A1 | 9/2008 |
| WO | 2008/132452 A2 | 11/2008 |
| WO | 2010/054034 A2 | 5/2010 |

OTHER PUBLICATIONS

International Search Report for Application No. PCT/EP2011/072190 dated Apr. 10, 2012.

* cited by examiner

\* - Cristobalite
↓ - SAPO34

\* - Cristobalite
↓ - SAPO34

\* - Cristobalite
↓ - SAPO34

PROCESS FOR THE PRODUCTION OF METAL DOPED ZEOLITES AND ZEOTYPES AND APPLICATION OF SAME TO THE CATALYTIC REMEDIATION OF NITROGEN OXIDES

The present invention is directed to a process for the production of metal doped Zeolites and Zeotypes. In particular, the method applied uses a sublimation step to introduce the metal within the channels/cages of the Zeolitic material. Hence, according to this dry procedure no solvent is involved which obviates certain drawbacks connected with wet exchange, impregnation or other metal addition processes known in the art.

Metal-doped Zeolites or Zeotypes and their use, in particular in the catalytic conversion of nitrogen oxides for example from waste or exhaust gases, are known from the state of the art. The metal-doped Zeolites and Zeotypes are doped with at least one metallic, catalytically active component. The catalytically active metal component is typically a transition metal, in particular a catalytically active metal such as copper or iron etc. These metal-doped Zeolites and Zeotypes are used in particular either in pure form or as constituents of coatings on catalyst structures.

The process of metal addition/exchange is the key step in converting 'white' Zeolite or Zeotype into the active form of a catalyst required to, e.g. facilitate the Selective Catalytic Reduction (SCR) of Nitric Oxide and Nitrogen Dioxide (NO and $NO_2$ respectively, hereafter Nitrogen Oxides or NOx) with Urea/$NH_3$ (or similar N-based reductant) in the exhaust train of a vehicle. Thus the production of metal doped/exchanged Zeolites and Zeotypes is an area of considerable academic and commercial interest, as testified by the extensive body of patents and open literature addressing this subject. The diverse methods for production of metal doped Zeolites may be grouped into several classes.

Firstly is the 'true' ion exchange involving the treatment of Alkali, Alkaline Earth or ammonium Zeolite/Zeotype by a buffering salt solution of the appropriate metal, potentially at elevated temperatures, in order to exchange the cation ($Na^+$, $K^+$, $NH_4^+$ etc.) by the desired metal. This method is exemplified by U.S. Pat. No. 4,961,917, U.S. Pat. No. 6,221,324, U.S. Pat. No. 7,049,261, U.S. Pat. No. 7,601,662, WO 2008/132452 A2, US application 2002/0016252 A1, Iwamoto et al. J Phys Chem 95(9) (1991) p3727-3730, Kapteijn et al. J Catal 167 (1997) p256-265, Kieger et al, J Catal 183 (1999) p267-280, Dedececk et al, J. Catal 200 (2001) p160-170, Groothaert et al. Phys Chem Chem Phys 5 (2003) p2135-2144, Moretti et al, J Catal 232 (2005) p476-487, Park et al. J. Catal 240 (2006) p47-57, Berthomieu et al, J Phys Chem B 110 (2006) p16413-16421, Bludsky et al. Phys Chem Chem Phys 8 (2006), p5535-5542, Brandenberger et al, Cat Rev 50(4) (2008) p492-531 and Sjoval et al. J Phys Chem C 113 (2009) p1392-1405 amongst others.

Secondly, metal doping may be achieved by the aqueous or slurry-based impregnation of the proton or ammonium Zeolite/Zeotype by appropriate precursor followed by high temperature calcination. This process is sometimes also referred as ion exchange but this is not correct in the strictest sense as the exchange only occurs during calcination after decomposition of the precursor which results in the formation of mobile ions, Hence this process can be less efficient than 'true' ion exchange and may result in an 'induction' phase in performance due to the material experiencing insufficient time at temperatures to achieve effective replacement of the protons of the structure by the metal ions. Examples of this approach may be found in U.S. Pat. No. 5,908,806, U.S. Pat. No. 5,116,586, U.S. Pat. No. 5,270,024, U.S. Pat. No. 5,271,913, U.S. Pat. No. 5,516,497, U.S. Pat. No. 5,776,423, Lee et al. App Cat B Env 5 (1994) p7-21 and Sueto et al. J. Chem. Soc. Faraday Trans. 93(4) 1997 p659-664.

Metal species may also be introduced directly into the framework structure via synthetic method e.g. as in the synthesis of Cu-ALPO-34 (Me-ALPO=Metal doped Aluminium Phosphate), Cu-APSO-34 (Me-APSO=metal doped Silicon-Aluminium Phosphate) and related Me-ALPO and Me-APSO systems reported in EP 1,142,833 B1, Frache et al. Cat Today 75 (2002) p359-365 and Palella et al. J Catal 217 (2003) p100-106.

Alternatively it is possible to introduce metal into the Zeolite/Zeotype by the means of Solid State Ion Exchange (SSIE). Herein metal doping is achieved by reaction, at 400-800° C. depending upon the specific precursor, between an intimate mixture of Zeolite/Zeotype and an appropriate high temperature volatile precursor e.g. metal Fluoride, Chloride etc. This method is exemplified by and, described in more detail in, U.S. Pat. No. 5,434,114, U.S. Pat. No. 5,545,784, Beyer et al. Zeolites 8 (1988) p79-81, Weckhuysen et al. J Catal 175 (1988) p338-346, and Brandenberger et al. Cat Rev 50(4) (2008) p492-531.

Metal modification may also be achieved via Chemical Vapour Deposition (CVD). Herein the Zeolite is 'degassed' at 500° C.[+] under reduced pressure to remove adsorbates e.g. water prior to its exposure, at room temperature, to saturated vapour of volatile metal precursor, again typically volatile halides or fluorocarbon metal salts. This approach is the basis of U.S. Pat. No. 6,043,177, Chen and Sachtler Cat Today 42 (1998) p73-83 and Kuroda et al. Chem Comm 22 (1997) p2241-2242. A further and somewhat related, method for metal doping is described in WO 2008/009453 A2 (or EP 0 955 080 B1) wherein 'de-gassed' ammonium Zeolite/Zeotype which has been 'intimately ground' with catalytically active metal is calcined at 400-600° C. for 10 to 16 h under reduced pressure in the presence of a nitrogen-containing compound e.g. an ammonium-salt. It is claimed that since the doping takes place as part of a solid-state ion exchange reaction under protective atmosphere, for example under $NH_3$ or $N_2$, that the anaerobic conditions during calcination provide a relatively long-term-stable metal-doped Zeolite. Similarly provisions are claimed in US2010075834, which discloses a method for the production of ion-exchanged Zeolites comprising:

i) provision of a dry mixture of
  a) a zeolite, and
  b) a compound of a catalytically active metal,
ii) intimate grinding of the mixture,
iii) heating of the mixture in a reactor to a defined temperature,
iv) maintenance of the mixture at the defined temperature, and
v) cooling to room temperature and obtaining the metal-doped zeolite.

This process is characterised in that the internal pressure in the reactor during the heating is kept in the range of 0-200 mbar. According to this teaching the catalytically active metal is preferably selected from the group consisting of Cu, Co, Rh, Pd, Tr, Pt, Ru, Fe, Ni, V. The catalytically active metal is used in the form of a salt, e.g. a nitrate, sulphate, sulphite, hydroxide, nitrite, etc. or in the form of a complex compound.

However despite this considerable body of work to date there remain outstanding challenges with regards to achieving a simple, robust and cost effective process for the production of metal containing Zeolites/Zeotypes. Thus while formal ion exchange is highly effective for production of active catalysts with high metal dispersion, there are multiple steps involved in the process, some of which are slow and costly to implement commercially and indeed may require several cycles to achieve optimal metal content e.g. U.S. Pat. No. 6,221,324 describes production of a Cu/Ca exchanged Na—Y Faujasite in within each successive ion exchange step (for Ca then Cu) requires stirring of the slurry/suspension of salt and Zeolite for 24 hours, Likewise U.S. Pat. No. 7,049, 261 provides a recipe for the production of 2.9 weight % Cu-ZSM5 catalyst which entails a threefold repetition of an exchange step with agitation of 24 hours, followed by filtering, washing and drying at 110° C. for 12 hours. Finally the material is calcined for 5 hours at 500° C. resulting in a total synthesis time of nearly 5 days. It should also be noted that ion exchange of Zeolites may present issues because certain species e.g. Iron salts form larger hydration sheaths, which makes difficult or even prevents a migration of the Iron species into the Zeolite. A final issue is that ion exchange generates an extensive waste stream potentially containing a mixture of Alkali or Alkaline Earth metals, ammonium hydroxide and nitrates produced during the repeated washing steps which itself requires costly treatment before it may be safely released into the environment.

Some of these issues are eased by the use of the impregnation/calcination process but as indicated the materials produced in this manner may exhibit inferior fresh performance due to decreased efficiency in initial ion exchange. In addition industrial scale application requires that this process should be performed via a slurry based precipitation wherein the precursor e.g. $Cu(NO_3)_2.3H_2O$ (or a solution thereof) is mixed with a slurry containing the white Zeolite/Zeotype. However the dissolution of the precursor results in the generation of an acid load in the slurry which in turn necessitates the addition of a basic (i.e. pH>7) compound to neutralize the acid before chemical damage can occur to the Zeolite/Zeotype as well as initiating the precipitation of the soluble metal species, as highlighted above. However care must be taken in selection of the base employed in order to limit complexation of the metal ion by the base as this would decrease the ability of the ion to enter into the pore/channel structure of the framework. Moreover, the base itself can attack/damage of the Zeolitic material, providing a further issue in the conventional wet process. In an attempt to address these issues organic bases, e.g. Tetra-Ethyl-Ammonium Hydroxide (TEAH), may be employed e.g. U.S. Pat. No. 5,908,806. However during calcination this organic species may undergo incomplete combustion and rather decomposes in an $O_2$-limited environment to produce harmful by-products which in turn limits throughput and requires additional process steps during calcination. On a commercial scale this would present a cost impact (additional scrubbers and/or slower calcination process with decreased part volume on the belt to minimise harmful emissions). Additionally, it is also known that metal-doped Zeolites or Zeotypes produced by the impregnation/calcination can suffer from limitations in durability. Specifically they undergo structural collapse and deactivation at T>800° C., arising from destabilisation of the framework by the acid-base chemistry of the slurry. This additional instability represents a concern for commercial implementation of SCR technology since these high temperatures can realised during diesel filter regeneration.

A final problem arises during ion exchange and impregnation processes when introducing catalytically active components into the Zeolites or Zeotypes which can have different stable oxidation states e.g. iron, vanadium or copper. Hence during an aqueous ion exchange, the catalytically active species may be further oxidised until a more thermodynamically stable, but less catalytically effective, oxidation state is obtained.

The use of framework doped Zeotypes produced by direct synthesis removes the above issues. However such materials have been found to demonstrate issues with hydrothermal durability as reflected in decreased crystallinity and surface area after aging as well as decreased activity of Cu in the framework vs Cu in conventional ion exchange positions (Frache et al. Cat Today 75 (2002) p359-365 and Palella et al. J Catal 217 (2003) p100-106). Moreover the increased complexity of the synthesis presents issues in reproducibility in terms of dopant concentration and location within the framework, both factors affecting the performance of the catalyst.

The issues for SSIE, CVD and related methods are broadly similar and may be summarized thusly. Firstly, all of these methods are associated with the release of harmful, and in some cases corrosive and/or toxic by-products e.g. HF, HCl etc. Given this release occurs at 400-800° C., potentially in the presence of residual moisture, a harmful environment to both humans and the integrity of the framework structure is created, Secondly, the temperatures required may exceed the thermal durability of the framework, and will, at the very least, result in sintering (crystal growth) which can adversely affect subsequent catalytic performance due to increases in mean free diffusion pathways. Thirdly there can be extensive residual contamination of the Zeolite/Zeotype with Alkali or other metals. This contamination arises from over-exchange of metal to weak acid centres associated with framework defects. It may be removed by washing, but only with the resultant exposure of the sample to alkaline materials e.g. NaOH which may result in further attack on the framework. In addition, the requirement for reduced pressures prior to and/or during metal doping presents technical and cost issues for scale up. Finally the processes as described above may lead to disadvantageously non-uniform metal distribution. Finally in the case of Iron-doped Zeolites catalytically active species $Fe^{2+}$ may be further oxidised to inactive $Fe^{3+}$ at high temperatures.

As indicated a key application of metal doped Zeolites/Zeotypes is the remediation of NOx via Selective Catalytic Reduction (SCR) using N-bearing reductant. Oxides of Nitrogen are well known and toxic by-products of internal combustion engines, fossil fuel electricity generation and industrial processes. NO is formed via the reactions of free radicals in the combustion process (see Y. B. Zeldovich (Acta Physico-chem. URSS, 21 (1946) 577), viz:

$$N_2 + O. \rightarrow NO + N. \quad (1)$$

$$N. + O_2 \rightarrow NO + O. \quad (2)$$

NOx are toxic to living beings (P. E., Morrow J. Toxicol Environ Health 13(2-3), (1984), 205-27), and contribute to several sources of pollution e.g. acid rain, photochemical smog and ozone, all which have been correlated to adverse impacts on human health (M. V. Twigg, Applied Catalysis B, vol. 70, (2007), 2). Hence stringent legislative limits have been introduced to regulate their emission e.g. Euro 5 and Euro 6 [Regulation (EC) No 715/2007 of the European Parliament, 20 Jun. 2007, Official Journal of the European Union L 171/1, Twigg, Applied Catalysis B, vol. 70, (2007), p2-25 and R. M. Heck, R. J. Farrauto Applied Catalysis A vol. 221, (2001), p443-457 and refs therein].

NOx control for stoichiometric gasoline engines is provided by the three way catalytic converter (e.g. see SAE 2005-01-1111). However three-way conversion is only effective under stoichiometric air: fuel ratios and not for diesel or other fuel lean i.e. oxygen rich combustion cycle e.g. lean gasoline direct injection, since. Thus the advantages of diesel engines with regards to durability, high torque at low rpm and increased fuel economy/decreased $CO_2$ and HC emissions also provide a challenge to fulfil NOx targets. Hence Urea/$NH_3$ SCR has been developed as one of a range of exhaust after-treatment technologies to address this requirement.

SCR chemistry comprises a complex set of decomposition (3—for Urea feed) and reduction-oxidation reactions (4-9) with diverse intermediates which form the basis for academic and practical study e.g. Fritz and Pitchon App Cat B 13 (1997) 1-25, Kondratenko et al. App Cat B 84 (2008) 497-504, Brüggemann and Keil J. Phys. Chem. C (2009), 113, 13930, SAE 2008-01-1184, SAE 2008-01-1323 etc. These reactions are summarized in equations 3-9. Equations 4-6 detail the desired chemistries of the SCR. However competing processes may occur e.g. parasitic oxidation of $NH_3$ (7-9). This may result in the formation of $N_2$ and $H_2O$, generation of $N_2O$, a powerful Greenhouse gas (ca. 300 stronger than $CO_2$), or even additional NOx.

$$(NH_2)CO + 4H_2O \rightarrow 2NH_3 + 6CO_2 \text{ Urea hydrolysis} \quad (3)$$

$$4NO + 4NH_3 + O_2 \rightarrow 4N_2 + 6H_2O \text{ standard/'slow' SCR} \quad (4)$$

$$3NO_2 + 4NH_3 \rightarrow (7/2)N_2 + 6H_2O \text{ } NO_2 \text{ only SCR} \quad (5)$$

$$NO + NO_2 + 2NH_3 \rightarrow 2N_2 + 3H_2O \text{ 'Fast' SCR} \quad (6)$$

$$4NH_3 + 3O_2 \rightarrow 2N_2 + 6H_2O \text{ parasitic } NH_3 \text{ oxidation to } N_2 \quad (7)$$

$$4NH_3 + 5O_2 \rightarrow 4NO + 6H_2O \text{ parasitic } NH_3 \text{ oxidation to NO} \quad (8)$$

$$2NH_3 + 2O_2 \rightarrow N_2O + 3H_2O \text{ parasitic } NH_3 \text{ oxidation to } N_2O \quad (9)$$

The principal reaction is represented in equation (4). However, under practical conditions it has been demonstrated that the reaction of 50:50 $NO/NO_2$ mixtures results in the highest rate of NOx conversion (6) (E. S. J. Lox Handbook of Heterogeneous Catalysis $2^{nd}$ Edition, p2274-2345 and references therein). However, while the reaction between $NH_3$ and $NO_2$ is known to occur (5), it is not kinetically dominant. Hence as $NO_2$ concentration increases above ca. 50% there is a concomitant decrease in catalyst activity and rate (Grossale et al. J. Catal, 256 (2008) 312-322).

Hence what is required in the art is a technology to provide highly active and selective metal doped/metal exchanged SCR catalysts with improved hydrothermal durability and decreased cost. This is to be achieved by development of a synthetic method for the production of metal-containing Zeolites and Zeotypes. This method should provide benefits of increased simplicity and robust production, decreased waste generation, high metal dispersion and decreased process cost. Additionally it must provide these improvements whilst providing materials which retain a wide operating range, tolerance to high $NO_2$ contents and high resistance to HC and SOx poisons present in the exhaust stream to fulfil the requirements of modern multi-brick emission control architectures.

The object of the present invention is the development of a method to produce metal-doped/metal-exchanged Zeolites and Zeotypes which provides for advantageous materials for the SCR of NOx, in particular in the exhaust of lean motor vehicles. In addition the present invention embraces a process which is advantageous over processes of the prior art, both from an ecological and an economical perspective.

These and other objectives known to those skilled in the art are met by applying a process for the production of metal-doped Zeolites or Zeotypes comprising the steps of:

i) providing a dry intimate mixture of a Zeolite or Zeotype with a precursor compound comprising a complex formed out of a transition metal selected from the group consisting of V, Cr, Mn, Fe, Co, Ni, Cu, Nb, Mo, Ru, Rh, Pd, Ag, and Ce and a ligand, the complex decomposing to yield the metal or metal ion at temperatures between 100° C. and 500° C.; and ii) calcining the mixture at a temperature and a time sufficient to initiate a solid state sublimation of the metal or metal ion; and iii) obtaining the metal doped Zeolite or Zeotype, in a very favourable and non-obvious manner. At the day this invention was made it could not have been foreseen by the artisan that the durability of the material and its catalytic properties are enhanced to such an extent compared to those of the prior art that either less material according to the invention causes a comparable effect or the same amount of material serves for superior results which in turn leads to reduced costs when produced on a commercial scale.

The artisan is aware of which Zeolites and Zeotypes may come into play when referencing appropriate framework structures which enable the reduction of NOx. To this end reference is made to the definitions and literature citations above. For the process of the present invention, however certain Zeolites and Zeotypes are deemed to be preferred. These are selected from the group consisting of one or a mixture of Faujasite type, Pentasil type, Chabazite Zeolite or Zeotype e.g. SAPO-34 or other '8-ring' structures of the structure type CHA and related structure types e.g. AEI, AFT, AFX, DDR, ERI, ITE, ITW, KFI, LEV, LTA, PAU, RHO, and UFI. More preferred are those selected from the group consisting of Pentasil type, SAPO-34, especially ZSM5 and Zeolite β, and Chabazite structure type. Most preferred are Chabazite/SAPO-34 and Zeolite β.

It has been proven that transition metals which readily undergo oxidation and reduction reactions may serve as prominent metals in view of reducing nitrogen oxides according to the SCR process. Favourable metals showing such behaviour are those selected from the group consisting of those metals defined as Transition metals i.e. the 38 elements in Groups 3 to 12 of the Periodic Table of Elements. Of these the metals according to the invention are those selected from the group consisting V, Cr, Mn, Fe, Co, Ni, Cu, Nb, Mo, Ru, Rh, Pd, Ag, and Ce. More preferred are those metals selected from the group of Fe, Cu, and Ce, Most preferred are metals like Cu and Fe in this regard.

In order to enable the metal to enter into the framework of the parent Zeolite or Zeotype structure, a metal precursor with modest volatility and an appropriate decomposition temperature, e.g. the complex is decomposing to yield the metal or metal ion at temperatures between 100° C. and 500° C., preferably 200° C.-450° C., is required, which may have a structure of formula I:

$$ML^1{}_m L^2{}_n \quad (I)$$

wherein:

M is a metal chosen from the group mentioned above.

$L^1$ may be carbonyl, amine, alkyl, alkoxy, alkene, arene, phosphine or other neutral coordinating ligand, m can be a number ranging from 0 to 6, n may take a number equal to the valence of M and $L^2$ advantageously embraces a diketonate, ketoiminato or related member of this Homologous series like a ligand of formula II:

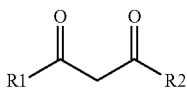
(II)

wherein:

R1 and R2 are independently alkyl, substituted alkyl, aryl, substituted aryl, acyl and substituted acyl.

Precursor compounds comprising a complex formed out of a metal and a ligand comprising a diketonate-structure are known to the artisan. Further details regarding these compounds and their production can be found in: Fernelius and Bryant Inorg Synth 5 (1957) 130-131, Hammond et al. Inorg Chem 2 (1963) 73-76, WO2004/056737 A1 and references therein. Further ligands in complexed form embrace a diketonate-structure are also known in the prior art, as exemplified in Finn et al. J Chem Soc (1938) 1254, Van Uitert et al. J Am Chem Soc 75 (1953) 2736-2738, and David et al. J Mol Struct 563-564 (2001) 573-578. Preferable structures of these types of ligands can be those selected from the group consisting of R1 and R2 in formula II as alkyls. More preferable these ligands are selected from the group consisting of R1 and R2 as methyl or tertbutyl; most preferred is acetylacetonate (acac, R1 and R2 in II are methyl groups).

When low-valent metal compounds are employed, carbonyl complexes which are preferably stable at room temperature with carbon monoxide as the ligand are preferred, considering their moderate volatility and decomposition temperatures. The syntheses of such compounds are well known and generally carried out by reducing a metal salt in the present of CO. Further details regarding these compounds and their preparation can be found in: Abel Quart Rev 17 (1963) 133-159, Hieber Adv Organomet Chem 8 (1970) 1-28, Abel and Stone Quart Rev 24 (1970) 498-552, and Werner Angew Chem Int Ed 29 (1990) 1077.

The mixture of Zeolites/Zeotypes and precursor compound subsequently has to be heated in order to mobilise the complexed metal to diffuse into the pores and channels of the framework. To enable this care must be taken to balance the temperature sufficiently to enable the decomposition of the precursor compound to initiate and facilitate diffusion whilst ensuring the temperature is not so excessive as to engender degradation of the framework or excessive sintering of the Zeolite/Zeotype crystals. Thus this calcination preferably takes place at temperatures of above 200° C. In a preferred embodiment the mixture is calcined at a temperature of 200-650° C. Most preferred a temperature between 350 and 450° C. is applied. It should be stressed that this process is not reliant upon reduced pressure or specific reaction gases and may be executed under a static or flowing gas e.g. air or inert gas like $N_2$ or a reducing atmosphere comprising e.g. about 0.5% to 4% $H_2$ without compromise to the performance of the final catalyst.

In addition it should be noted that the duration of the calcination or heating procedure should occur within an appropriate range. The high temperature exposure of the mixture may typically last up to 12 hours. Preferably the thermal treatment comprises a time of around 1-5 hours. In a very preferred manner the mixture is exposed to the high temperature treatment as depicted above. Advantageously, the mixture is exposed to temperatures of around 350-450° C. for 1-5 hours. Most preferred the process is performed around 350° C. for a period of 90 to 150 minutes.

In order to ensure that the catalytically required concentration of the metal sublimes/diffuses into the pore, cages and channels of the Zeolite and Zeotype, specific ratios of both ingredients should be present in the mixture. Hence, it is preferable that the mixture comprises the framework material and the precursor compound such that decomposition of the precursor results in a metal concentration within the Zeolite/Zeotype of about of about 0.01 wt % metal to about 10 wt % metal, preferably 0.1-7.5 weight %. More preferably the metal concentration within the Zeolite/Zeotype should be in the range of about 1 to 4 wt %. Most preferably the metal concentration within the Zeolite/Zeotype should be from about 1.5 to about 2.5 wt %. It should be noted at this point that this loading of metal is somewhat lower than that described in the prior art, wherein higher metal loads and indeed the requirement for 'excess' metal is described as this protects the Zeolite from hydrothermal aging (WO2010-054034 or WO2008-106519 A1).

A second embodiment of the present invention is directed to a material or mixture of materials produced according to the process of the invention, wherein the material or mixture of materials when applied to a support as depicted in the following catalyses the reduction of oxides of nitrogen via reaction with a nitrogen-containing reducing agent at a temperature of as low as 100° C. The term "catalyses the reduction of oxides of nitrogen via reaction with a nitrogen-containing reducing agent at a temperature of as low as 100° C." has to be understood in the sense that the reduction takes place at 100° C. to a certain extent. Preferably, the reactivity at 100° C. compared to the maximum reactivity of the material or mixture of materials is >0.2%, more preferred >0.5% and most preferred >1%.

In a further aspect the present invention is directed to a catalyst comprising the material or mixture of materials obtained according to a process of the present invention, wherein the catalyst comprises an inert refractory binder selected from the group consisting of alumina, titania, non-Zeolitic silica-alumina, silica, zirconia and mixtures thereof coated on a flow through ceramic monolith, metal substrate foam or on a wall-flow filter substrate. In a preferable way the catalyst described above is produced in a manner, wherein the material or mixture of materials described above and the binder are coated in discrete zones on a flow through ceramic monolith, metal substrate foam or on a wall-flow filter substrate.

In still a further aspect the present invention is directed to a monolith catalyst formed via extrusion of the material or mixture of materials according to a process of the present invention.

A different embodiment of the present invention concerns the use of a catalyst or monolith catalyst as presented above for the selective catalytic reduction of oxides of Nitrogen. Advantageously, the use of such a catalyst or monolith catalyst is handled in a manner, wherein the source of nitrogen-containing reductant is introduced to give an effective $NH_3$ NOx ratio ($\alpha$ ratio) at the catalyst inlet of 0.5 to 2. Furthermore, the use of a catalyst or monolith catalyst as described above preferably happens when the $NO:NO_2$ ratio recorded at the inlet of the catalyst is from 1:0 to 1:3 by volume, preferably 1:0.8 to 1:1.2, most preferably around 1:1.

Normally, the material or mixture of materials produced according to the process of the invention come along as a catalytic device which comprises a housing disposed around a substrate with an SCR catalyst comprising the material or mixture of materials and being disposed at the substrate. Also, the method for treating the off-gas of a gasoline lean burn or compression ignition exhaust or lean fossil fuel combustion exhaust stream can comprise introducing the said exhaust stream to such an SCR catalyst; and reducing to $N_2$ the NOx component of said exhaust stream.

The material or mixture of materials can be included in the formulation by combining alumina, silica or other appropriate binder and optionally with other catalyst materials e.g. Ce-based oxygen storage component to form a mixture, drying (actively or passively), and optionally calcining the mixture. More specifically, a slurry may be formed by combining the material of the invention with alumina or silica and water, and optionally pH control agents e.g. inorganic or organic acids and bases and/or other components. This slurry can then be wash-coated onto a suitable substrate. The wash-coated product can be dried and heat treated to fix the washcoat onto the substrate.

This slurry produced from the above process can be dried and heat treated, e.g. at temperatures of ca. 350° C. to ca. 1000° C., or more specifically about 400° C. to about 600° C., to form the finished catalyst formulation. Alternatively, or in addition, the slurry can be wash-coated onto the substrate and then heat treated as described above, to adjust the surface area and crystalline nature of the support.

The catalyst obtained comprises a Zeolite/Zeotype metal exchanged by the sublimation method disclosed herein. The catalyst may additionally comprise an inert refractory binder. The supported catalyst can subsequently be disposed on a substrate. The substrate can comprise any material designed for use in the desired environment. Possible materials include cordierite, silicon carbide, metal, metal oxides (e.g., alumina, and the like), glasses and the like, and mixtures comprising at least one of the foregoing materials. These materials can be in the form of packing material, extrudates, foils, perform, mat, fibrous material, monoliths e.g. a honeycomb structure and the like, wall-flow monoliths (with capability for diesel particulate filtration), other porous structures e.g., porous glasses, sponges, foams, and the like (depending upon the particular device), and combinations comprising at least one of the foregoing materials and forms, e.g., metallic foils, open pore alumina sponges, and porous ultra-low expansion glasses. Furthermore, these substrates can be coated with oxides and/or hexaaluminates, such as stainless steel foil coated with a hexaaluminate scale. Alternatively the cation-doped lattice material may be extruded, with appropriate binders and fibres, into a monolith or wall-flow monolithic structure.

Although the substrate can have any size or geometry the size and geometry are preferably chosen to optimise geometric area in the given exhaust emission control device design parameters. Typically, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

Once the supported catalytic material is on the substrate, the substrate can be disposed in a housing to form the converter. The housing can have any design and comprise any material suitable for application. Suitable materials can comprise metals, alloys, and the like, such as ferritic stainless steels (including stainless steels e.g. 400-Series such as SS-409, SS-439, and SS-441), and other alloys (e.g. those containing nickel, chromium, aluminium, yttrium and the like, to permit increased stability and/or corrosion resistance at operating temperatures or under oxidising or reducing atmospheres).

Also similar materials as the housing, end cone(s), end plate(s), exhaust manifold cover(s), and the like, can be concentrically fitted about the one or both ends and secured to the housing to provide a gas tight seal. These components can be formed separately (e.g., moulded or the like), or can be formed integrally with the housing methods such as, e.g., a spin forming, or the like.

Disposed between the housing and the substrate can be a retention material. The retention material, which may be in the form of a mat, particulates, or the like, may be an intumescent material e.g., a material that comprises vermiculite component, i.e., a component that expands upon the application of heat, a non-intumescent material, or a combination thereof. These materials may comprise ceramic materials e.g., ceramic fibres and other materials such as organic and inorganic binders and the like, or combinations comprising at least one of the foregoing materials.

Thus, the coated monolith with metal-doped/metal exchange catalyst is incorporated into the exhaust flow of the fuel lean engine. This provides a means for treating said exhaust stream to decrease concentrations of NOx by passing said exhaust stream over the aforementioned SCR catalyst under net oxidising conditions in the presence of inexhaust injected Urea or Ammonia, or other N-bearing reductant to facilitate catalytic conversion into environmentally benign Nitrogen gas.

Figure 4A:
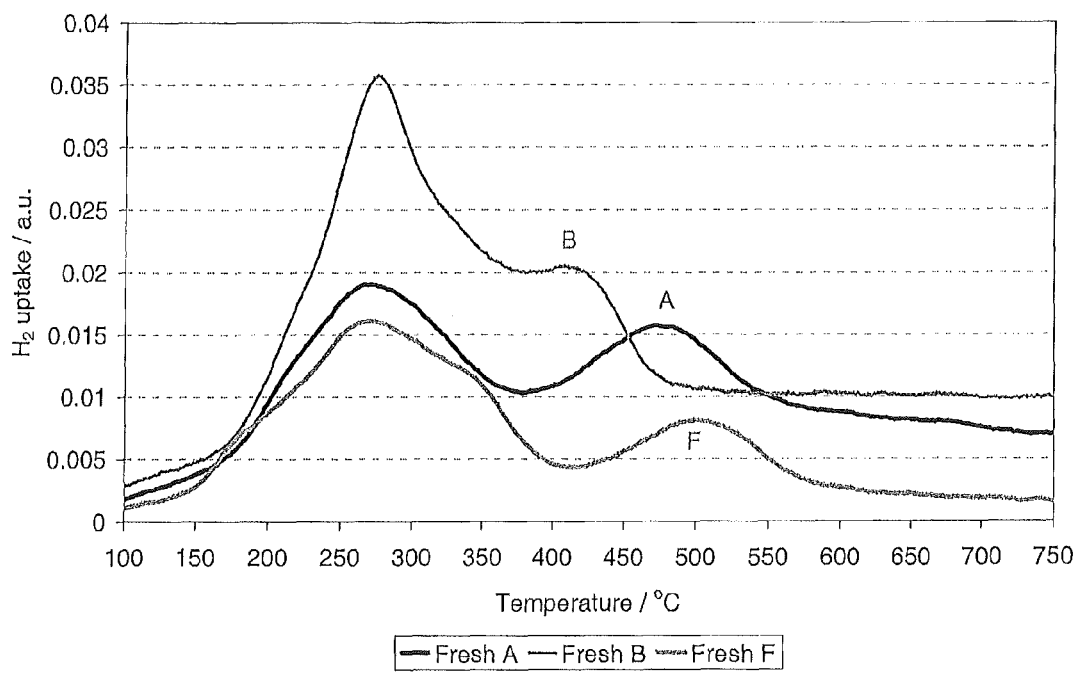

FIG. 4a compares the $H_2$ Temperature Programmed Reduction (TPR) characteristics of fresh 3% Cu-SAPO34 samples.

Figure 4B:
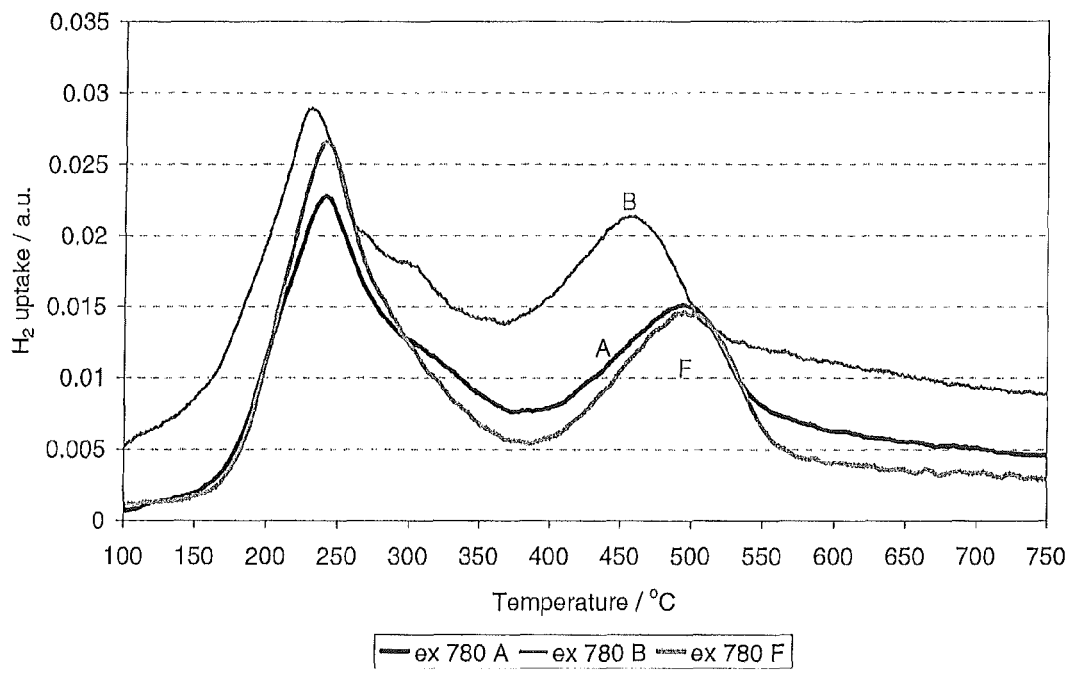

FIG. 4b shows the $H_2$ TPR of 3% Cu-SAPO34 samples after aging at 780° C. in air.

Figure 5A:
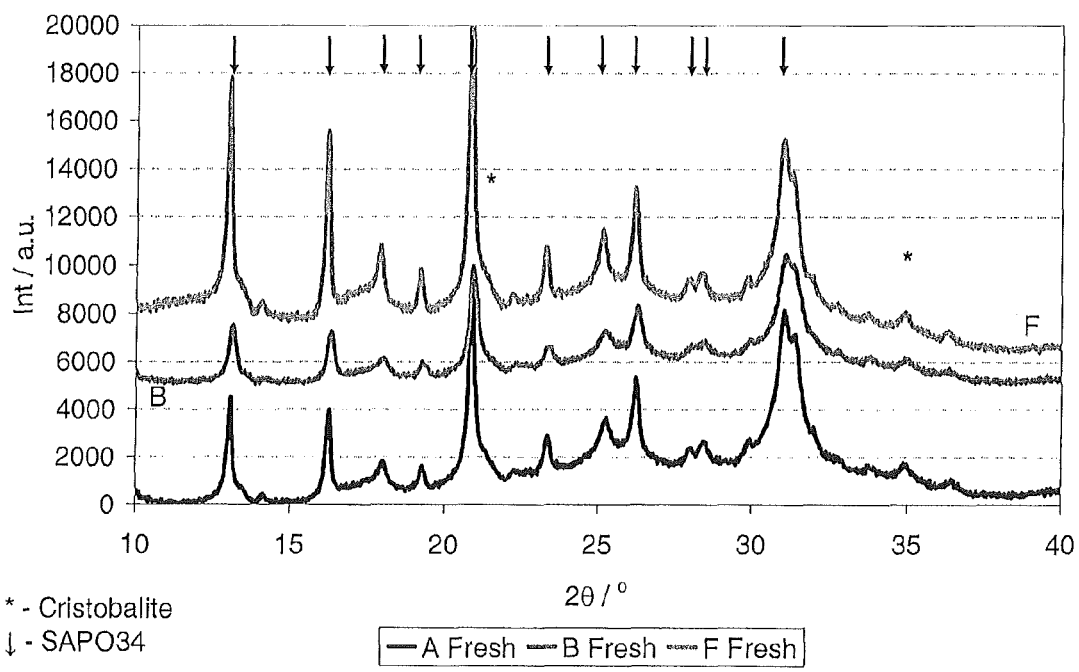

FIG. 5a contrasts the fresh XRD patterns of 3% Cu-SAPO34 variants.

Figure 5B:
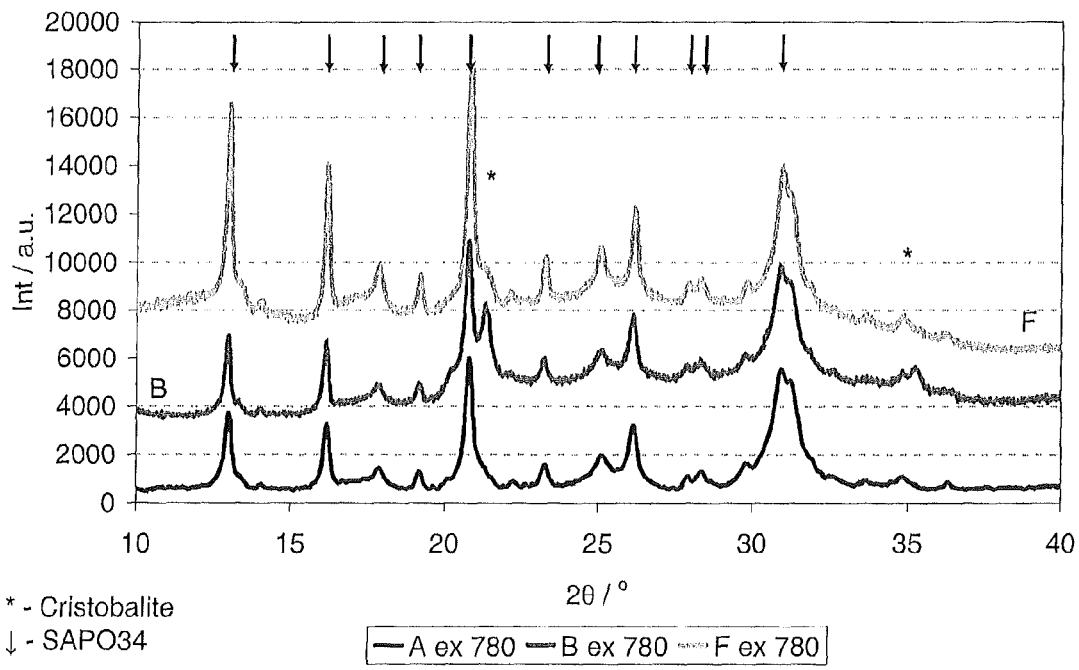

FIG. 5b summarises the XRD of the samples of FIG. 5a. ex 780° C. air aging.

Figure 5C:
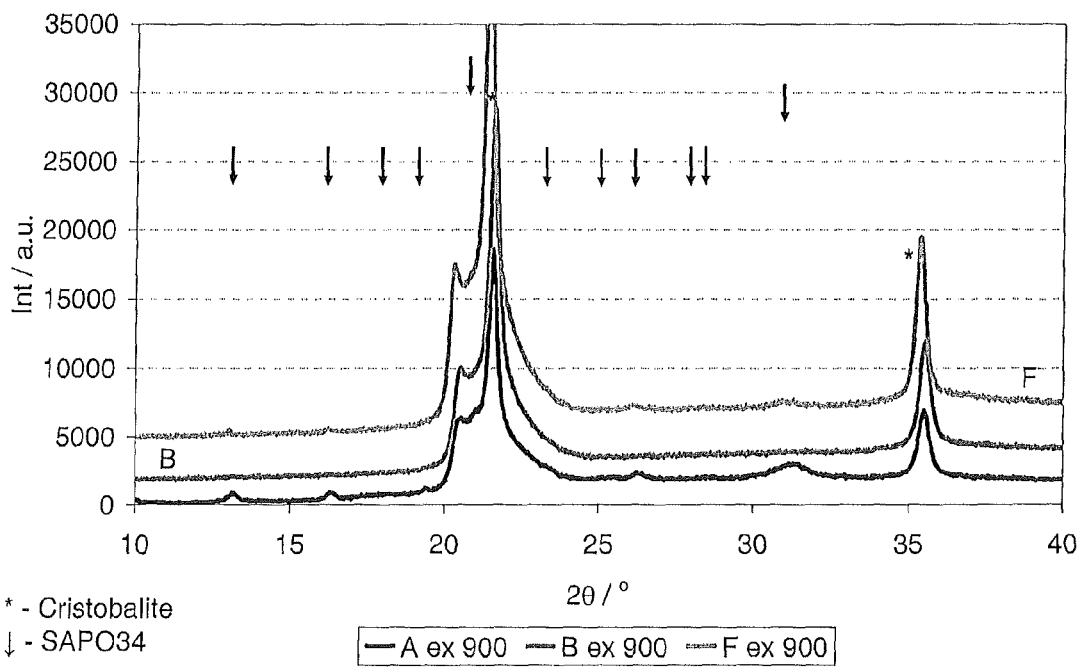

FIG. 5c records the XRD patterns of the samples of FIG. 5a, ex 900° C. air aging.

Figure 6A:
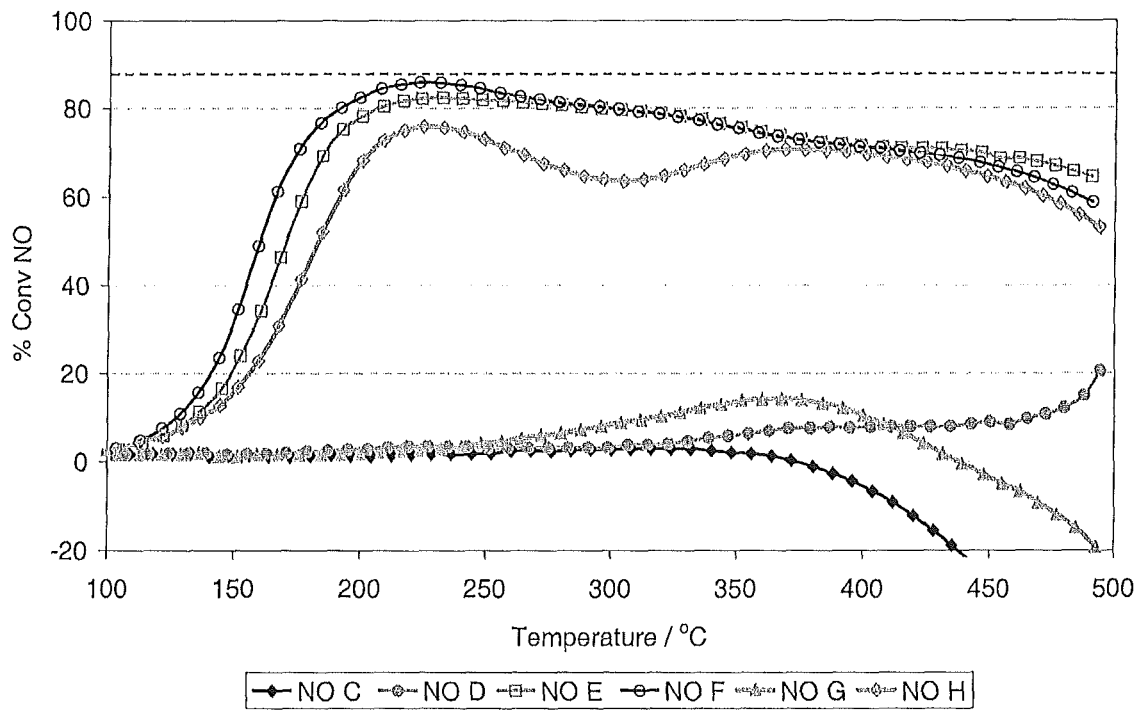

FIG. 6a presents the fresh NO conversion of 3% Cu-SAPO34 variants prepared using the Cu precursors and methods detailed in Table 2.

Figure 6B:
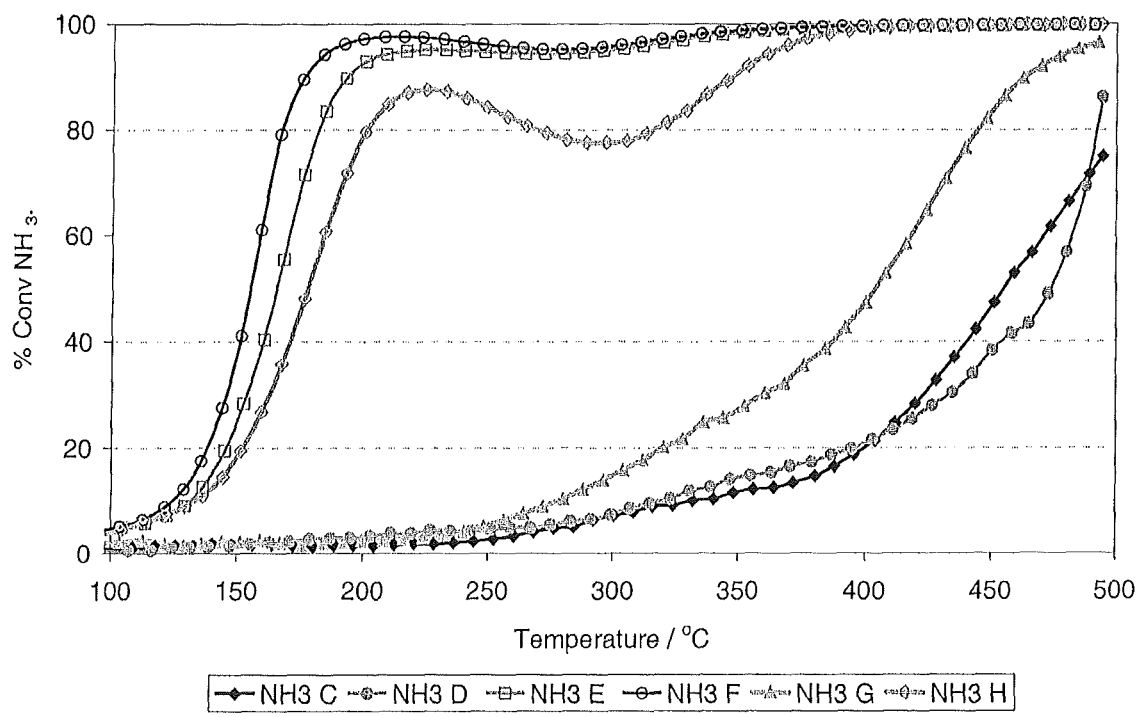

FIG. 6b summarises the fresh $NH_3$ conversion for 3% Cu-SAPO34 samples prepared using the precursors and methods detailed in Table 2.

Figure 7A:
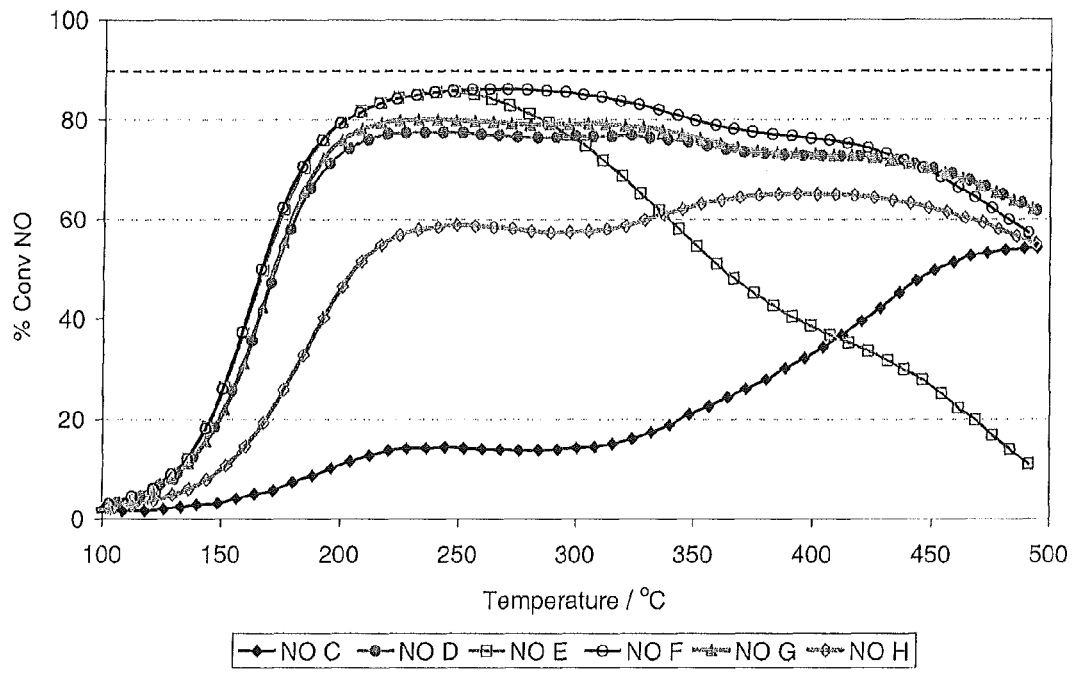

FIG. 7a shows the NO conversions of the materials reported in FIG. 6a after a 12 hour aging cycle at 780° C. in air.

Figure 7B:
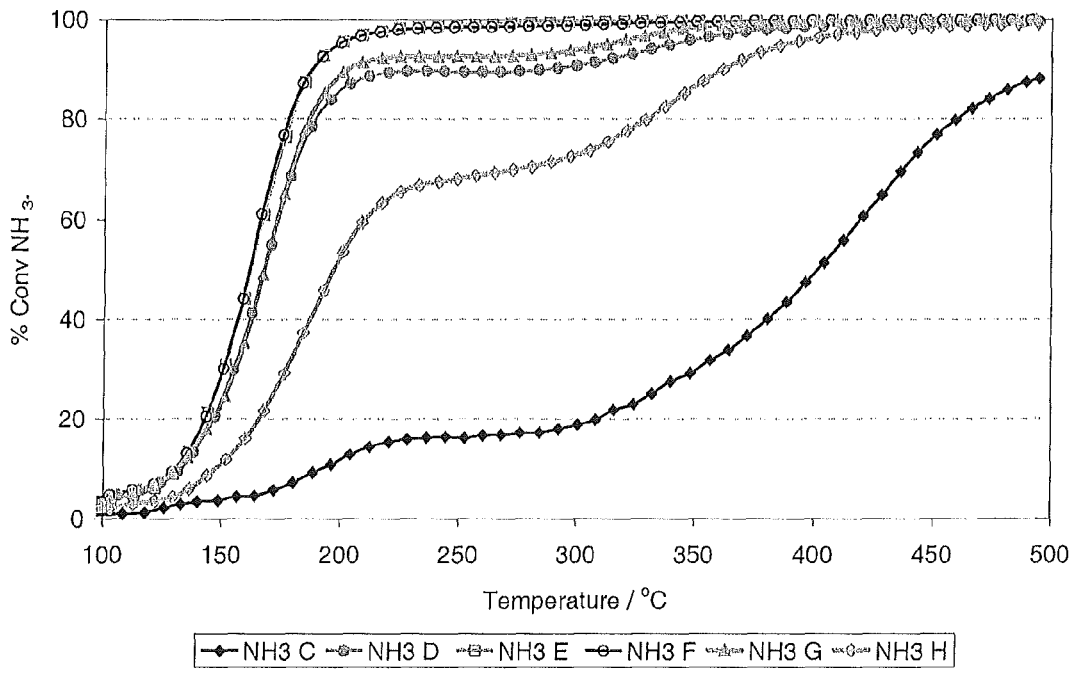

FIG. 7b depicts the $NH_3$ conversions of the materials reported in FIG. 6b after a 12 hour aging cycle at 780° C. in air.

Figure 8A:
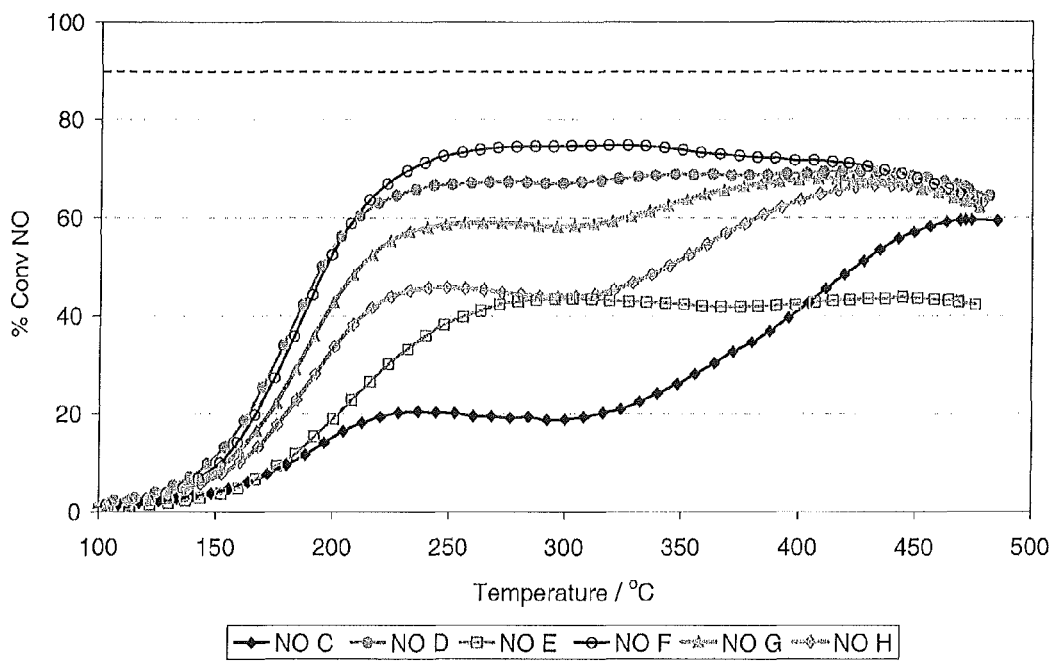

FIG. 8a reports the NO conversions of the materials reported in FIG. 6a after an aging cycle comprising 2 hours at 900° C. in air.

Figure 8B:
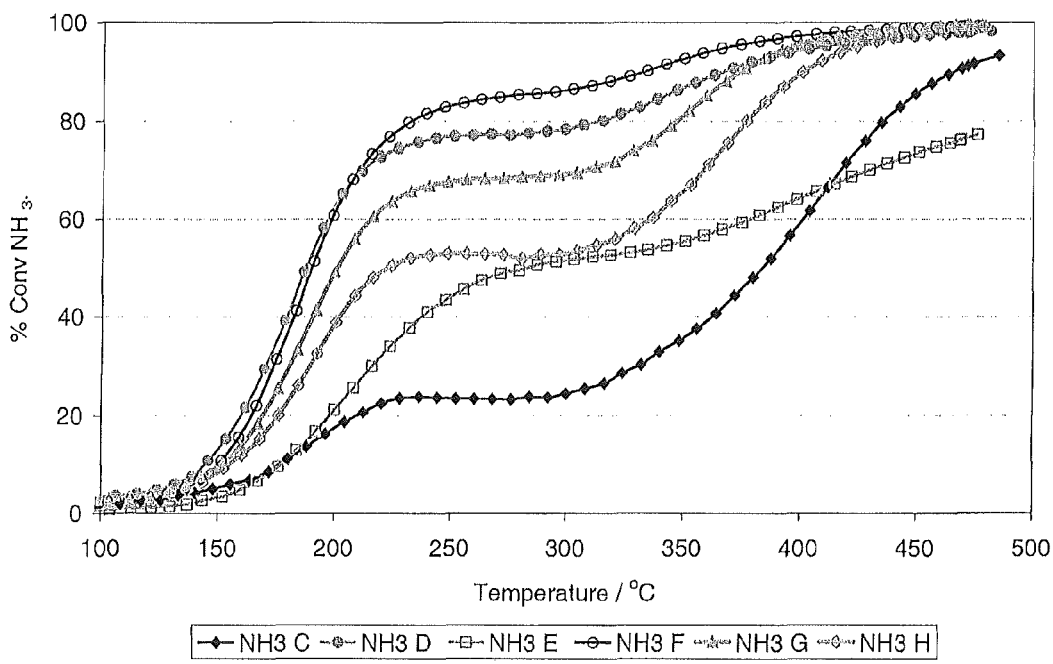

FIG. 8b is a summary of the $NH_3$ conversions activity of the materials reported in FIG. 6b after an aging cycle of 2 hours at 900° C. in air.

Figure 9:
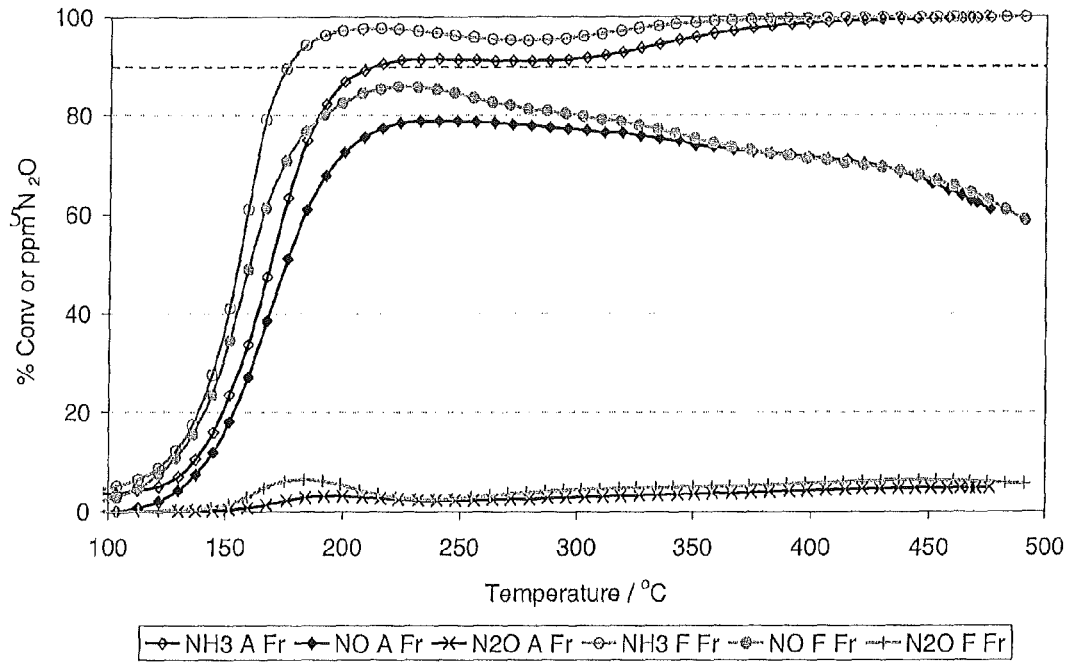

FIG. 9 compares and contrasts the fresh activity of two 3% Cu-SAPO34 samples prepared by a standard (A) vs sublimation method employing $Cu(acac)_2$ precursor (F).

Figure 10:
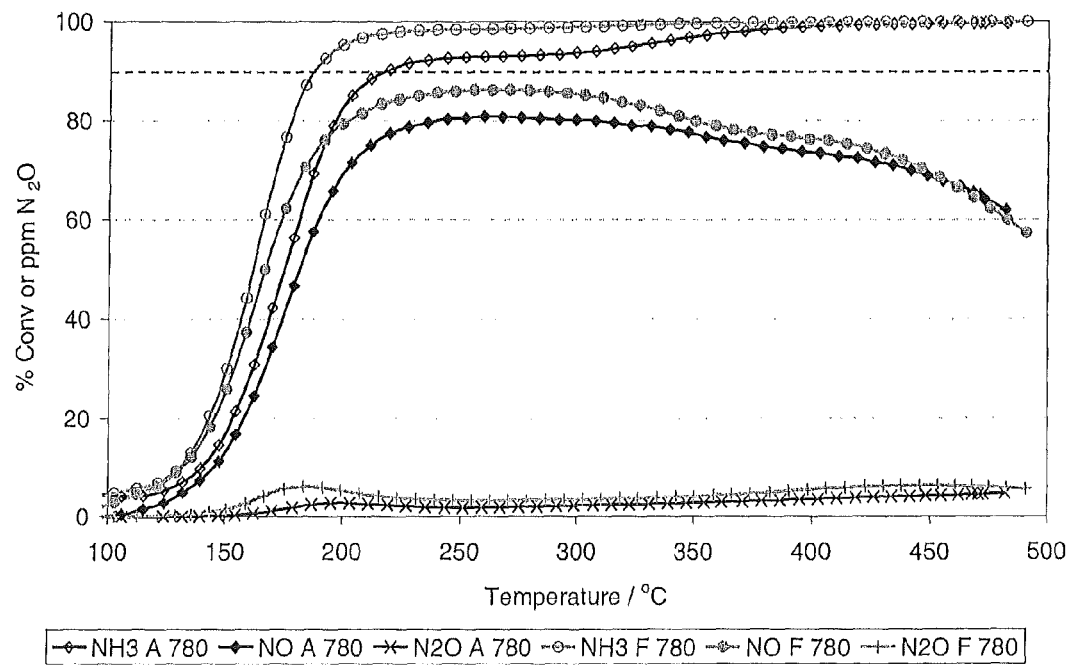

FIG. 10 compares the activity of 3% Cu-SAPO34 samples prepared by standard (A) vs sublimation method (F), after a 780° C. aging for 2 (A) or 12 (F) hours resp.

Figure 11:
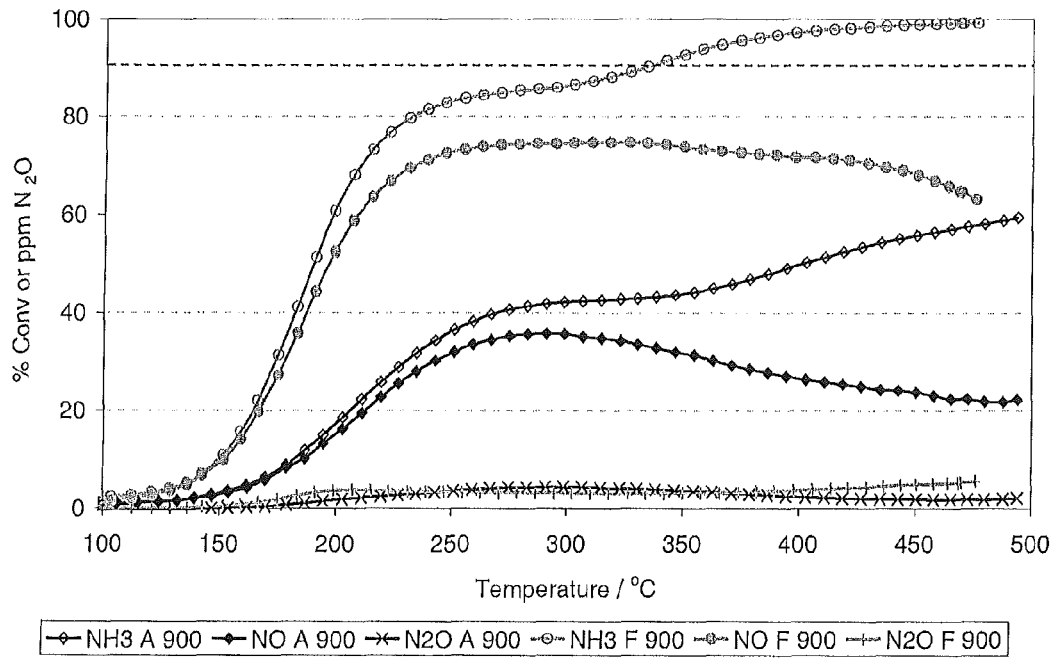

FIG. 11 contrasts the activity of 3% Cu-SAPO34 samples prepared by a standard (A) vs sublimation method, as described in Table 2 (F) after aging at 900° C. in air for 2 h.

Figure 12A:
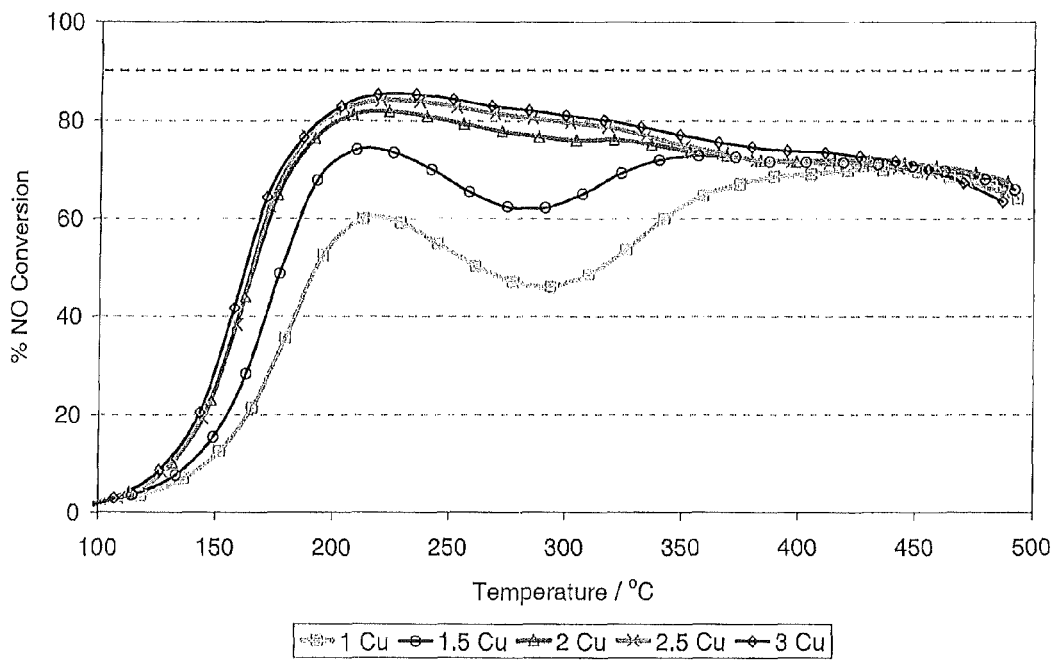

FIG. 12a shows the impact of Cu loading on fresh NO conversion of a series of Cu-SAPO34 samples produced by sublimation at 500° C. in $N_2$.

Figure 12B:
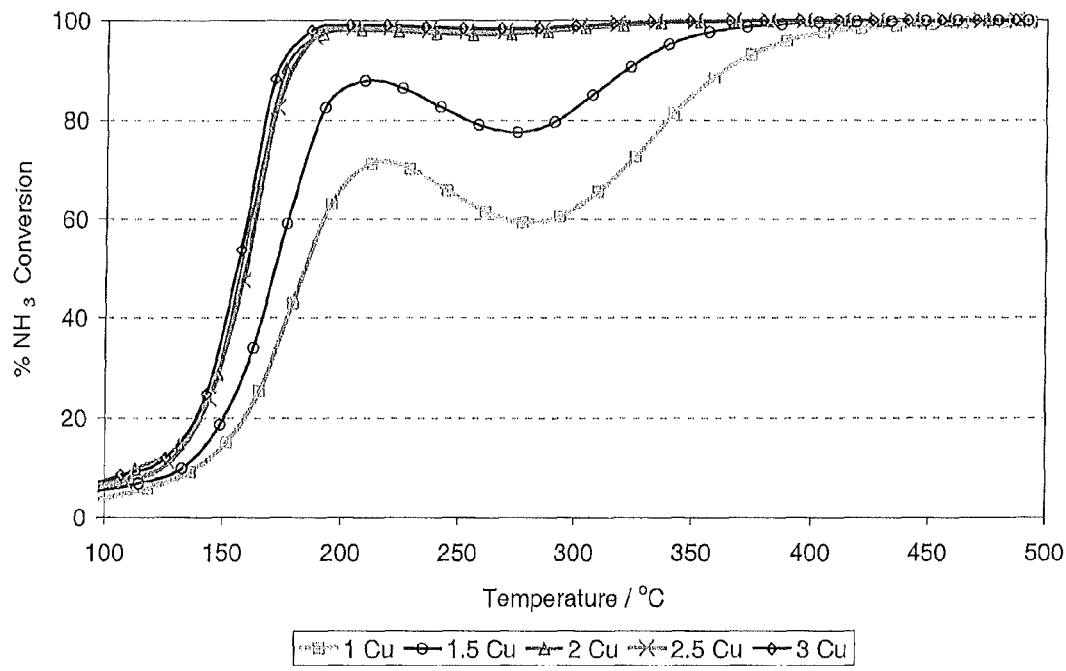

FIG. 12b highlights the effect of Cu loading on the fresh $NH_3$ conversion of a series of Cu-SAPO34 samples produced by sublimation method at 500° C. in $N_2$.

Figure 13A:
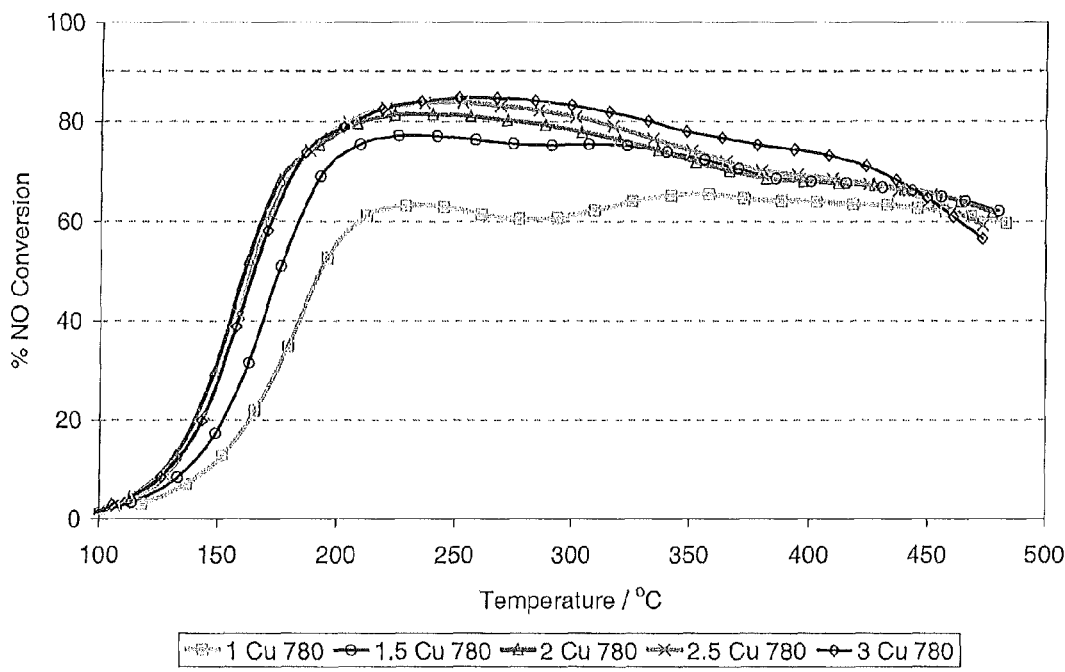

FIG. 13a records the NO conversion of the samples ex FIG. 12a following an aging cycle comprising 2 hours at 780° C. in air.

Figure 13B:
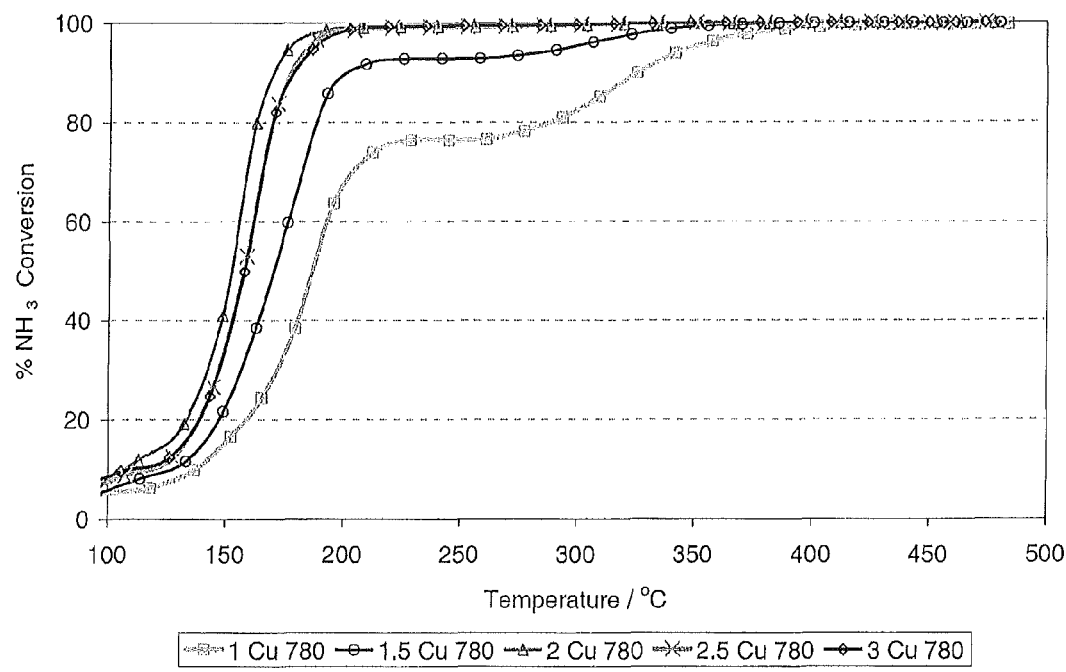

FIG. 13b illustrates the $NH_3$ conversion of the samples ex FIG. 12b following an aging cycle comprising 2 hours at 780° C. in air.

Figure 14A:
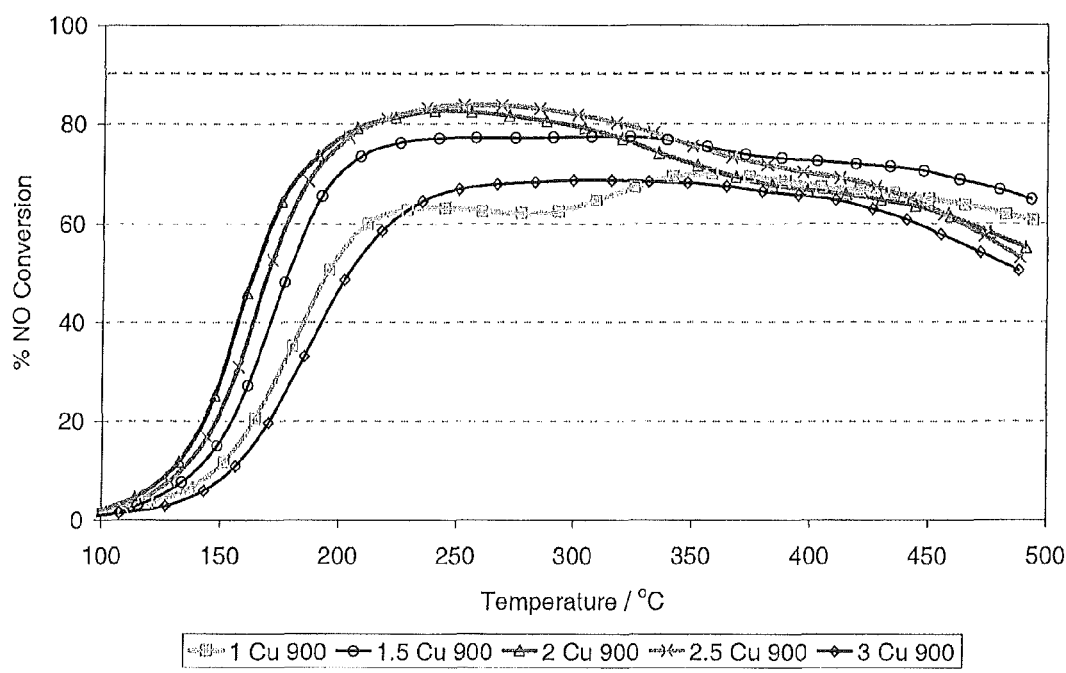

FIG. 14a shows the NO conversion of the samples ex FIG. 12a following an aging cycle wherein the sample is exposed to air at 900° C. for 2 hours.

Figure 14B:
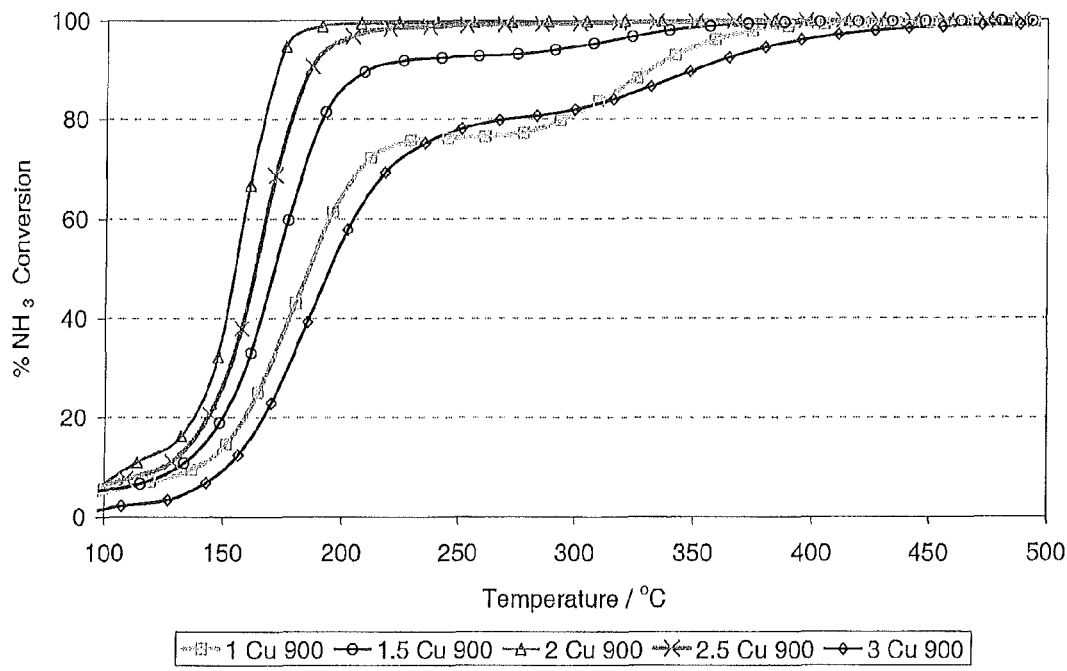

FIG. 14b summarises the $NH_3$ conversion of the samples ex FIG. 12b following an aging cycle of 900° C. for 2 hours in air.

Figure 15:
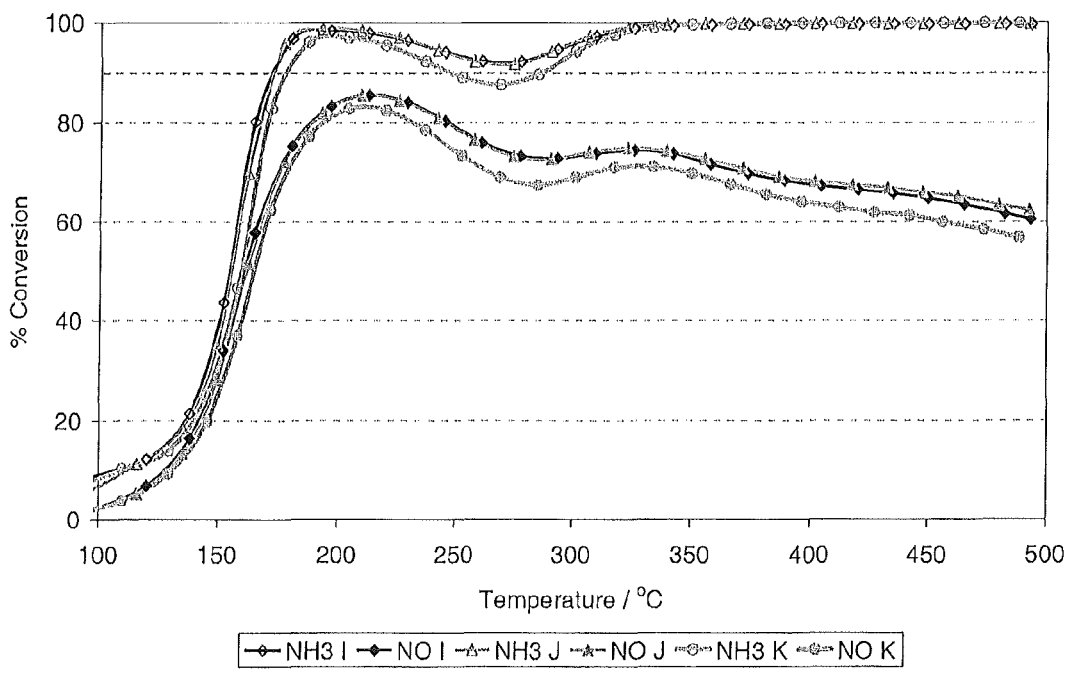

FIG. 15 shows the fresh activity for 2% Cu-SAPO34 samples prepared by variant forms of the sublimation method in which the impact mixing method was examined.

Figure 16:
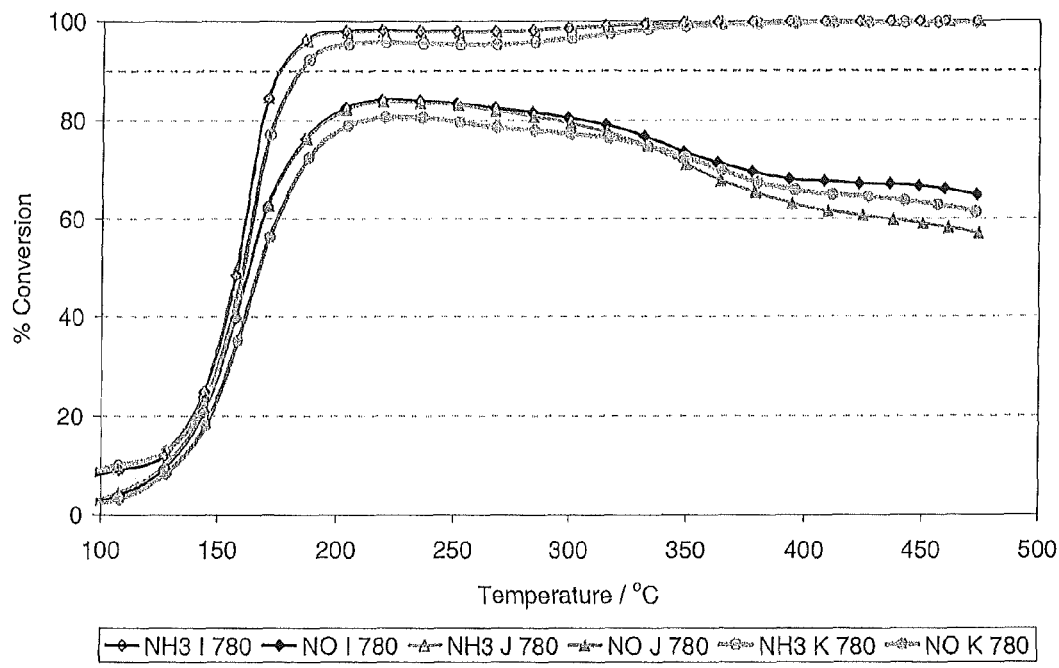

FIG. 16 summarises the performance of the samples ex FIG. 12 after catalyst aging at 780° C. in air for 2 hours.

Figure 17:
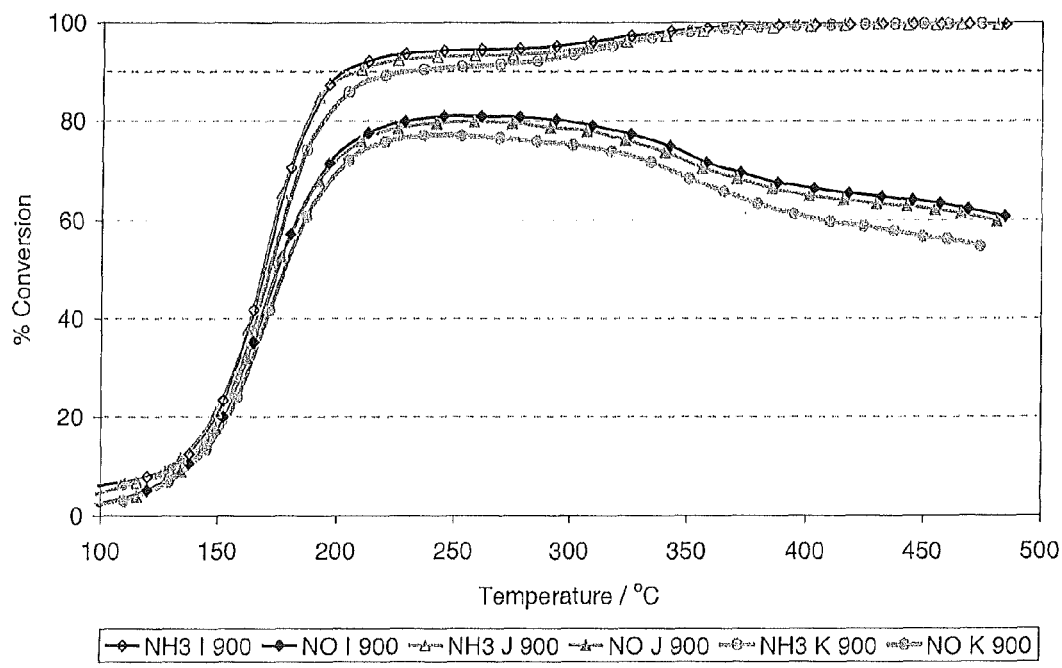

FIG. 17 depicts the performance of the samples ex FIG. 12 after catalyst aging at 900° C. in air for 2 hours.

Figure 18:
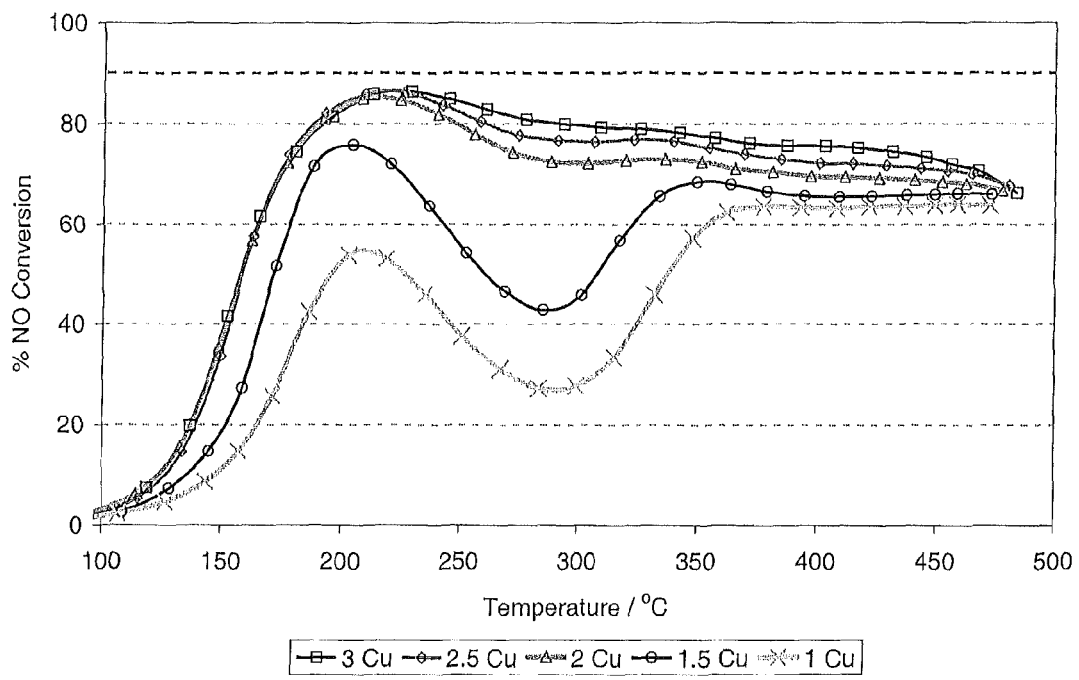

FIG. 18 examines the effect of Cu loading on the fresh NO conversion of a series of Cu-SAPO34 samples produced by sublimation at 350° C. in air.

Figure 19:
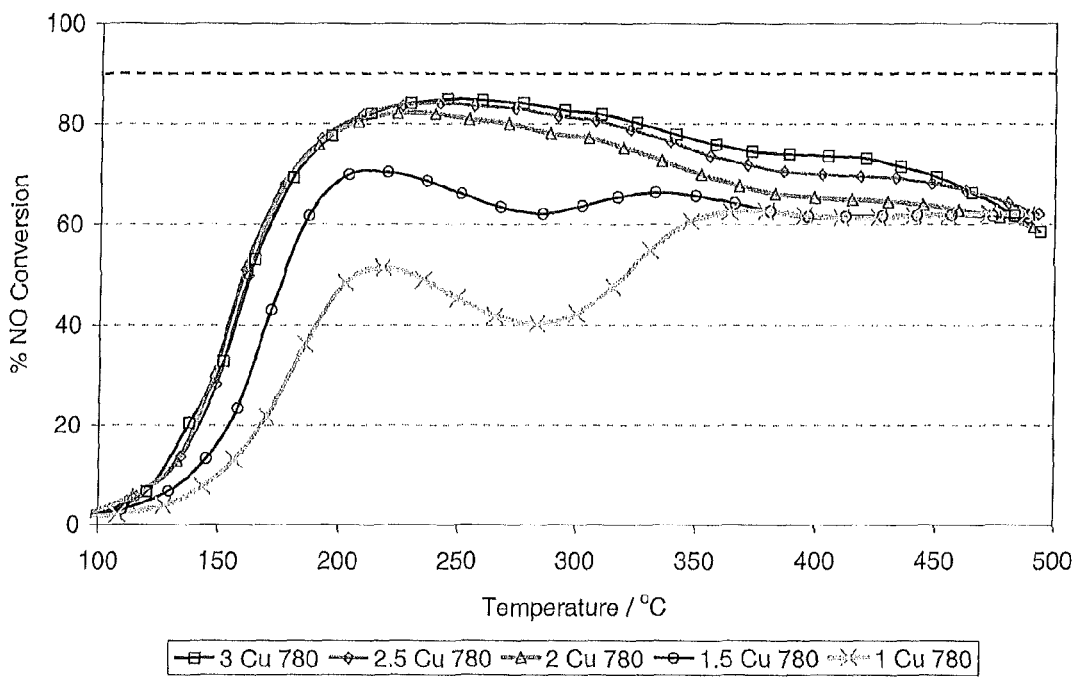

FIG. 19 reports the performance of the samples ex FIG. 18 after aging for 2 hours at 780° C. in air.

Figure 20:
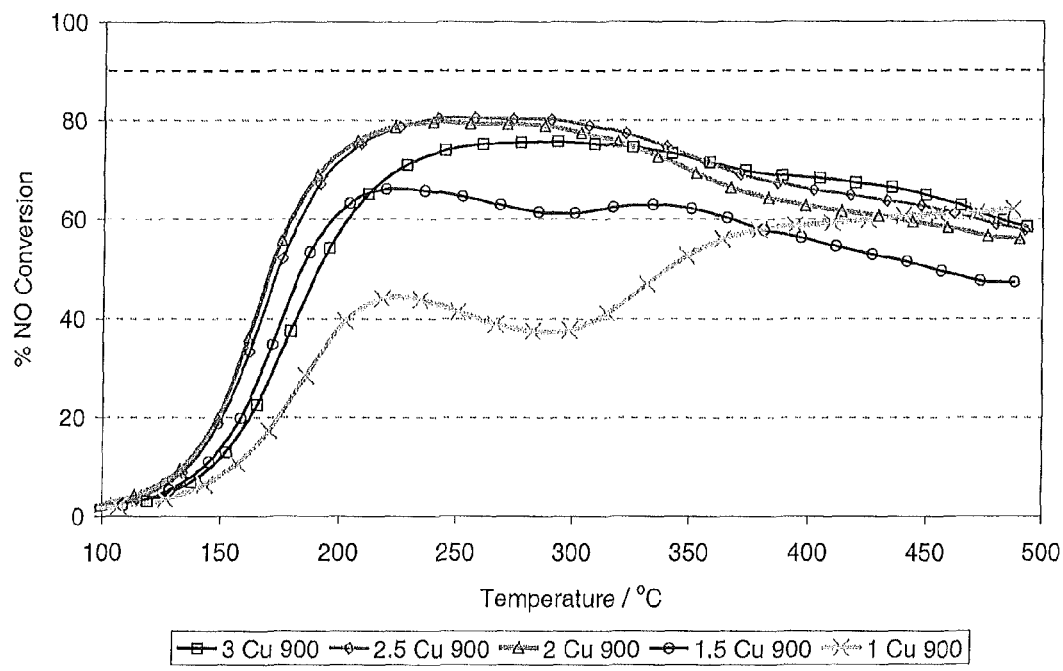

FIG. 20 is a summary of the samples ex FIG. 18 after aging at 2 hours at 900° C. air.

Figure 21:
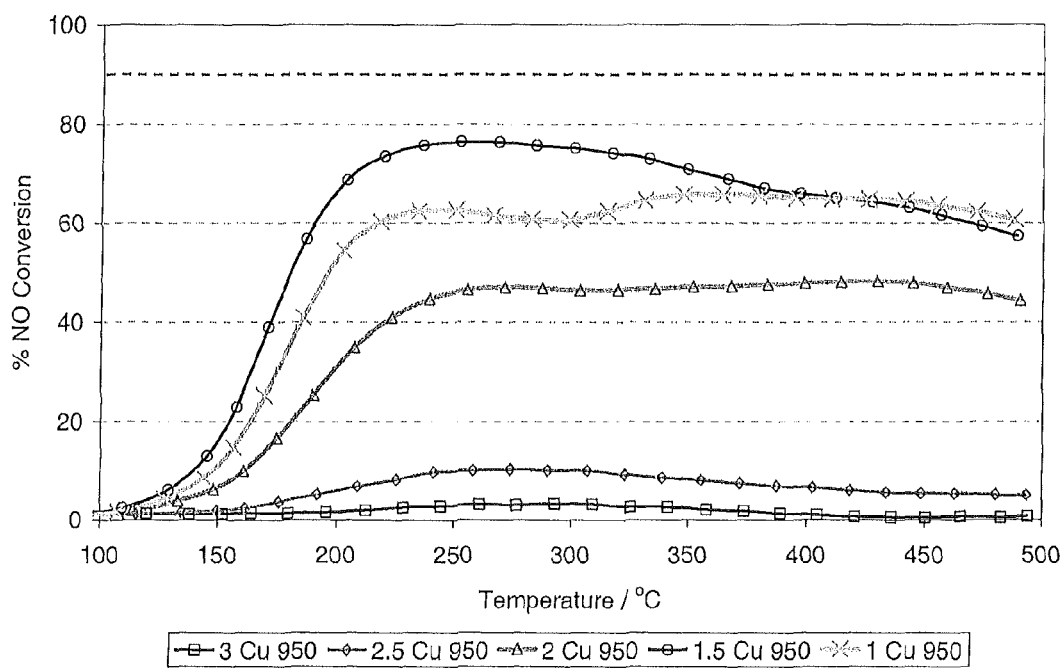

FIG. 21 shows the performance of the samples ex FIG. 18 after catalyst aging at 950° C. in air for 2 hours.

Figure 22:
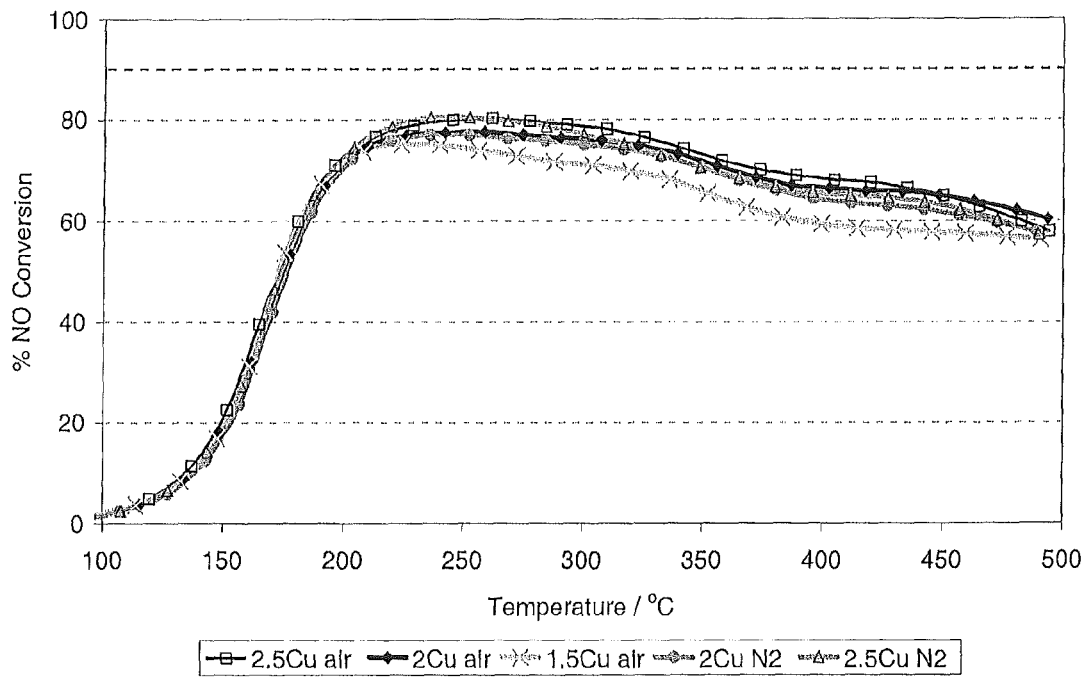

FIG. 22 records the conversion data for the samples ex FIG. 18 after a hydrothermal aging cycle comprising 16 hours at 750° C. in a mixture of air and 10% steam.

Figure 23:
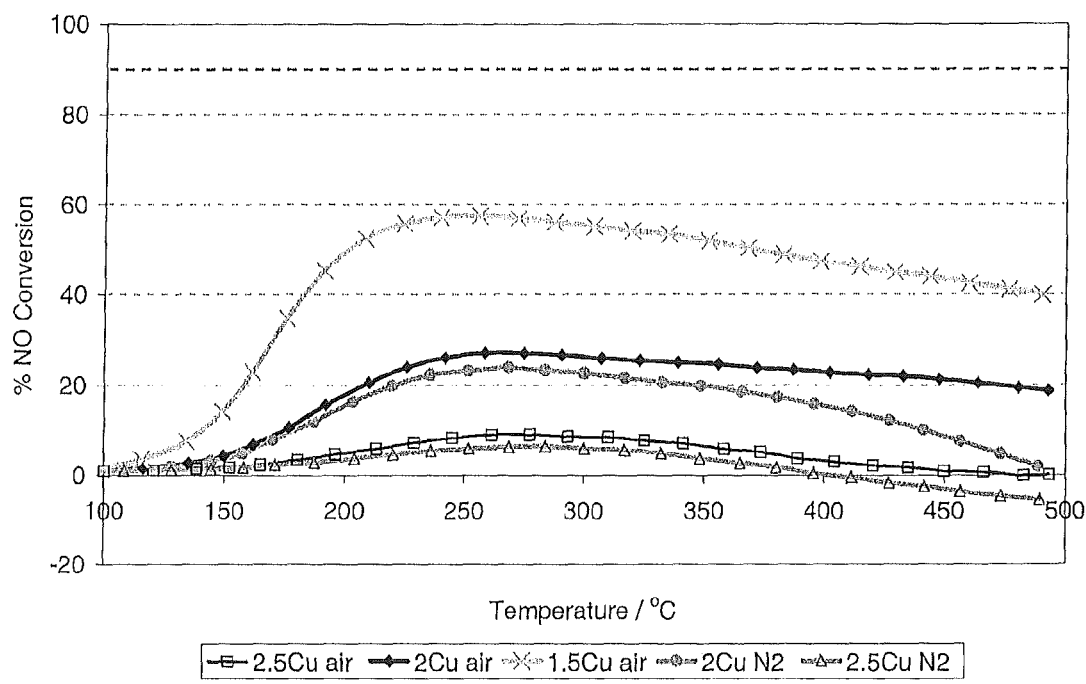

FIG. 23 shows the performance data for the samples ex FIG. 18 after a hydrothermal aging cycle comprising 4 hours at 900° C. in a mixture of air and 10% steam.

Figure 24:
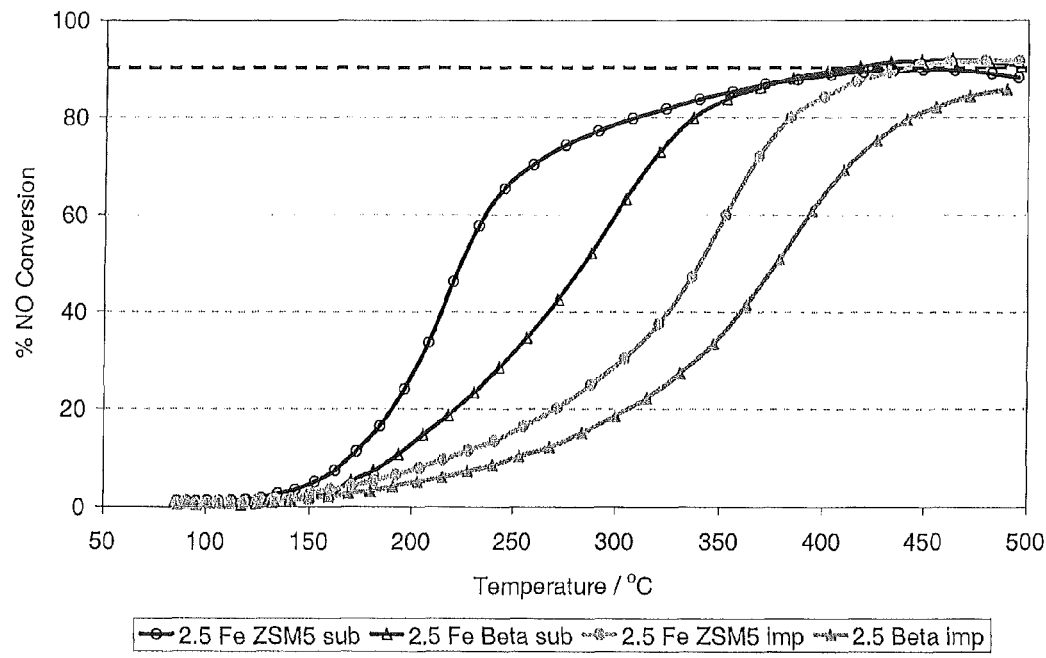

FIG. 24 compares the de-greened NO conversion data for 2.5 wt % Fe ZSM5 and Zeolite β samples, prepared by either wet impregnation or via the sublimation method.

Figure 25:
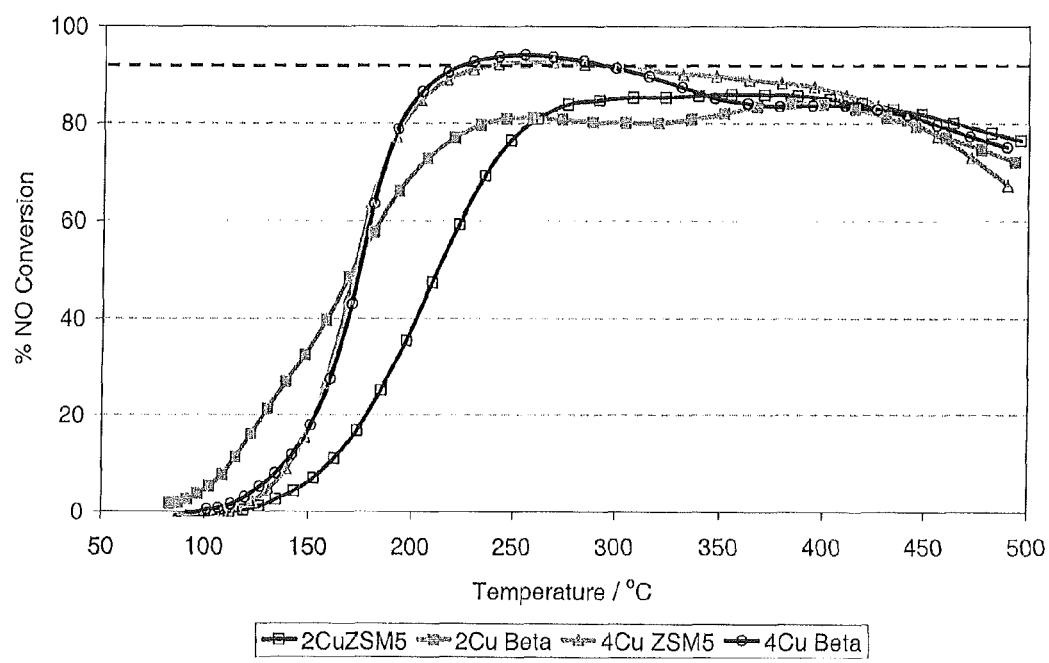

FIG. 25 summarises the de-greened NO conversion data for 2 and 4 wt % Cu doped ZSM5 or Zeolite β.

SAMPLE KEY

A: 3% Cu-SAPO34 ex $Cu(NO_3)_2$ solution addition to well mixed SAPO34 slurry,
B: 3% Cu-SAPO34 ex $Cu(NO_3)_2$ crystal addition to poorly mixed SAPO34 slurry,
C: 3% Cu-SAPO34 ex physical mix
D: 3% Cu-SAPO34 ex calcined physical mix
E: 3% Cu-SAPO34 ex aqueous Ion Exchange
F: 3% Cu-SAPO34 ex sublimation of Cu acetylacetonate
G: 3% Cu-SAPO34 ex sublimation of Cu Oxalate ($CuC_2O_4$)
H: 3% Cu-SAPO34 ex sublimation of Cu Acetate (Cu $(CH_3COO)_2$)
I: 2% Cu-SAPO34 ex sublimation with mixing using a paint shaker (see main text)
J: 2% Cu-SAPO34 ex sublimation with mixing using a coffee mill (see main text)
K: 2% Cu-SAPO34 ex sublimation with mixing using an overhead stirrer (see main text)

The following set of data include a diverse range of preparation examples employing different metal loads, metal precursors and process variations as an illustration of the flexibility of the metal doping method and its application to SCR. Direct comparison versus conventional synthesis methods (ion exchange and slurry impregnation/calcination) are made to illustrate the performance and durability benefits of the new method, The data set herein is an exemplary set of a much larger body of work and makes reference to catalytic performance measurements. These measurements were performed using a conventional plug flow model gas reactor. In these measurements gas streams, simulating lean burn exhaust gas from, were passed over and through meshed particles of test samples under conditions of varying temperature and the effectiveness of the sample in NOx reduction was determined by means of on-line FTIR (Fourier Transform Infra-Red) spectrometer, Table 1 details the full experimental parameters employed in the generation of the data included herein,

TABLE 1

| Model Gas testing conditions | |
|---|---|
| Component/Parameter | Concentration/Setting |
| $NH_3$ | 450 ppm |
| NO | 500 ppm |
| $H_2O$ | 3% |
| $O_2$ | 5% |
| Temperature | Ramp 500 to 85° C. @ −2° C./min |
| Sample mass | 200 mg |
| Particle size of sample | 500-700 μm |
| GHSV | 100000 $h^{-1}$ |

Figure 1:
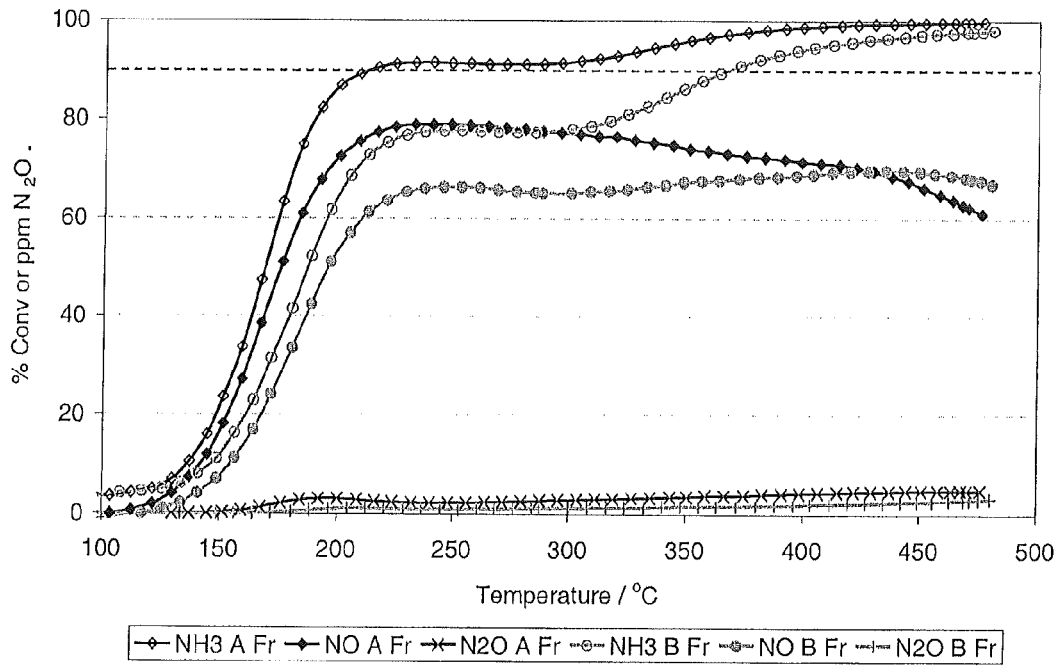
FIG. 1 shows data for model gas testing of two reference 3% Cu-SAPO34 samples, A and B prepared by conventional impregnation method as described in the examples.
Figure 2:
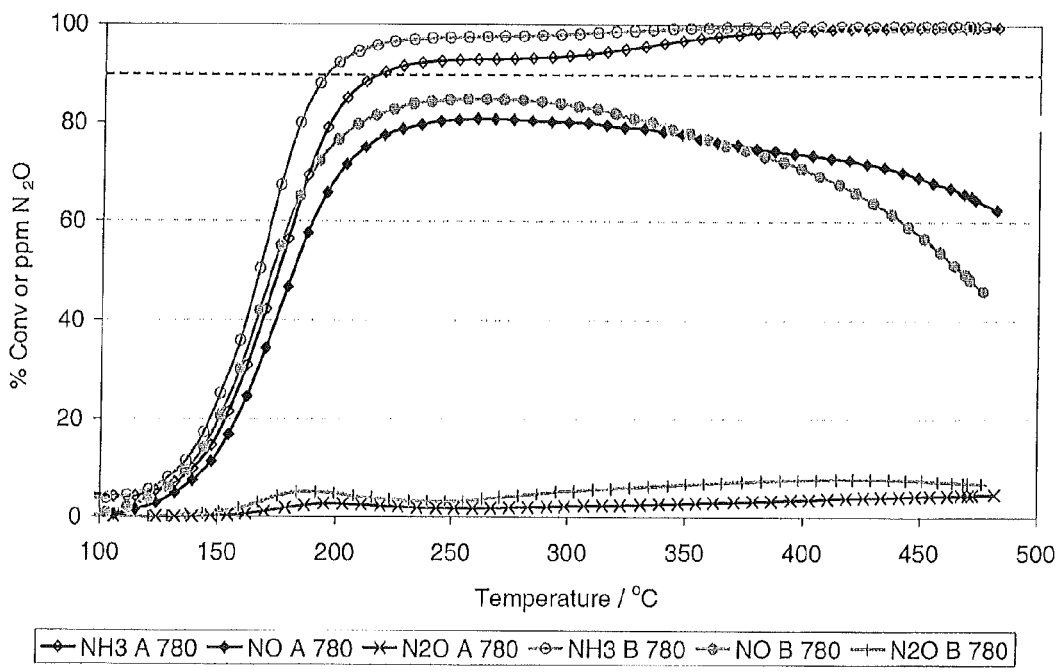
FIG. 2 depicts the model gas testing performance data of the reference samples, A and B, after a 2 hour aging cycle performed at 780° C. in air.
Figure 3:
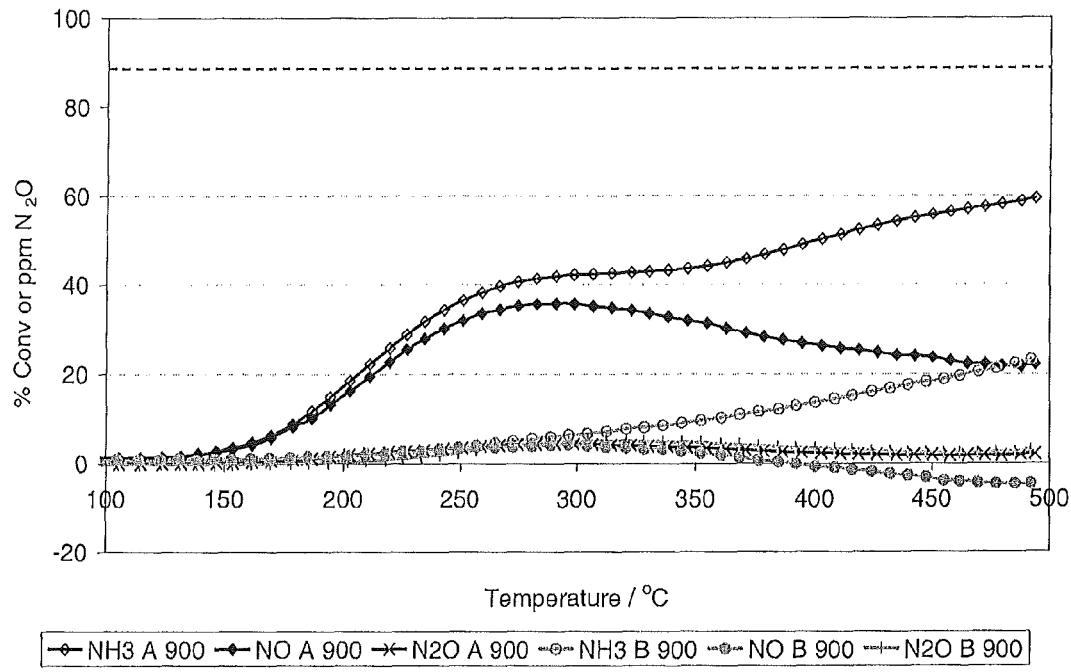
FIG. 3 illustrates the activity A and B after a 2 hour aging cycle of 900° C. in air.

FIGS. 1-3 summarise the performance data for two comparative reference samples of 3% Cu-SAPO34, A and B, produced by a conventional slurry impregnation/calcination method (see examples). These data reflect the inherent problems of this approach and its dependence upon mixing for synthesis of 'good' materials. Hence sample B displays decreased fresh activity, in terms of both $NH_3$ activation and subsequent NOx reduction, Sample A, produced with 'good' mixing, is better with ca. 20% higher NOx conversion during the 'light-off' (T<200° C.), and intermediate temperature ranges (200<T<300° C.). However at no point does the NO conversion of either sample approach the theoretical maximum of 90% at the feed ratio, or α, of 0.9. Indeed maximum conversion for sample A peaks at ca. 80% between 210<T<270° C. This decreased NOx conversion is consistent with an $NH_3$ conversion limited to only ca. 90% in the same temperature range, implying an inherent activity limitation for this sample. This limited $NH_3$ conversion is addressed in the high temperature window (T>300° C.) for both samples. However in neither case does increased $NH_3$ conversion correspond to an improvement in NOx conversion, and especially in the case of sample A there is rather a decrease in $N_2$ i.e. an increase in NO and $N_2O$, consistent with increased rates of parasitic oxidation of $NH_3$ (see introduction reactions 7-9). After aging for 2 hours in air at 780° C. sample A shows small losses in activity at lower temperatures (<200° C.) but improvements in both NO and $NH_3$ conversion at all other temperatures, consistent with a mild induction effect. In contrast sample B the low temperature and peak NO and $NH_3$ conversions are ca. 20% higher with the sample now exhibiting better effectiveness for $NH_3$ utilisation in SCR versus the fresh state. Such effects are archetypal of induction phenomenon. These data are consistent with TPR data shown in FIGS. 4a and 4b. Herein sample A displays a bi-modal reduction response, one peak at ca. 250° C., consistent with reduction of dispersed CuO and a second peak at ca, 475° C., indicative of a CuO-based species more difficult to reduce, typical of metal oxide stabilised/ion-exchanged in the Zeolite. In comparison sample B shows a larger redox feature due to dispersed CuO and a smaller high temperature feature, at ca. 425° C., indicative of framework-exchanged species. After 780° C./air aging both samples show a more similar bi-modal response. This is consistent with the high temperature migration of Cu to ion exchange sites. However such Cu migration can also give rise to the formation of bulk CuO species (Tenorite), which is an active $NH_3$ oxidation catalyst at higher temperatures. Hence it is unsurprising that at T≥400° C. the NO conversion of sample B shows a marked decrease in $N_2$ selectivity due to the increased NO and $N_2O$ formation, again consistent with increased parasitic $NH_3$ oxidation. The enhanced non-selective oxidation for the B sample is also consistent with the TPR in FIG. 4b, wherein an additional peak at ca. 275° C. is noted, consistent with the reduction of bulk CuO. Upon further aging, for 2 hours at 900° C. in air, the differences between the two compositionally equivalent materials are even clearer. Hence sample B is completely deactivated and exhibits only residual parasitic $NH_3$ oxidation at T>300° C. In contrast sample A retains some SCR function, albeit suppressed, with a peak NO conversion of ca, 35%. Such a catastrophic deactivation is of concern given peak temperatures may approach or even exceed 900° C. e.g. during a catalysed filter regeneration—especially if the engine drops to idle midcycle. The reasons for this catastrophic deactivation are clear from XRD analysis (FIGS. 5a-5c). Both fresh samples present reflexions consistent with the parent SAPO-34 framework. There is no evidence of X-Ray discrete CuO or other phases arising from destruction of the SAPO-34 during slurry processing. This is not the case after air aging at 780° C. where the B sample, produced with 'poor' mixing, exhibits clear reflexions at ca, 21° and 35° consistent with the presence of Cristobalite, a $SiO_2$ based mineral phase. This phase can only be produced via Si loss from the SAPO-34 i.e. slurry impregnation/calcination results in a premature structural collapse of the framework. This collapse is apparent for both samples after aging at 900° C. in air (FIG. 5c). The collapse is again more severe for the B sample given that minor reflexions consistent with residual SAPO-34 phase are evident for the 'well' mixed sample A. These issues are reflected in Table 3 which summarises fresh and aged surface area (BET). Herein sample B presents a decreased fresh BET and an evidence of surface area/structural collapse after aging at 780° C. Hence from these data it may be seen that the conventional synthesis method exhibits severe deficiencies with respect to both performance and durability.

In order to address these deficiencies a series of additional comparative reference and test powders of Cu-SAPO34 were produced, as detailed in Table 2 and described in the examples.

TABLE 2

Sublimation Synthesis Precursor Trials:

| Sample | wt % Cu | Precursor/method |
|---|---|---|
| C | 3 | Intimate physical mixture of CuO and SAPO34 no calcination |
| D | 3 | Intimate physical mixture of CuO and SAPO34 calcined 2 h 500° C. in air |
| E | 3 | Ion Exchange using Cu Acetate followed by calcined 2 h 350° C. in air |
| F | 3 | Intimate physical mixture of Cu(Acac)$_2$ with calcination 2 h 350° C. in air |
| G | 3 | Intimate physical mixture of Cu Oxalate with calcination 2 h 50° C. in air |
| H | 3 | Intimate physical mixture of Cu Acetate with calcination 2 h 350° C. in air |

Note samples C, D, E may be considered as further comparative references.

TABLE 3

Surface Area Analysis of 3% Cu-SAPO34 samples fresh and aged

| sample | BET fresh (m$^2$/g) | BET ex 780° C. (m$^2$/g) |
|---|---|---|
| A | 619 | 563 |
| B | 572 | 511 |
| F | 612 | 600 |

Their SCR efficacies were examined giving the results in 6a-8b. The activity of theses samples is quite diverse. Fresh samples E, F and H display high conversions of both NO and $NH_3$, whereas fresh C, D and G do not and in fact at T>350° C. display increasing propensity towards non-selective oxidation of $NH_3$ with concomitant NOx production, and hence apparent negative conversions of NO. After aging at 780° C. (12 hours/air) samples E, F and H show equal or worse performance i.e. no induction effect or premature collapse, whereas samples C, D and G exhibit significant performance gains, especially samples D and G, reflecting an especially strong induction effect. Further aging at 900° C. results in decreased NO and $NH_3$ conversion for all samples. However it should be stressed that the performance loss is a fraction of that exhibited by samples A and B produced by the conventional process. Thus peak NO conversions range from ca, 40 to ca. 70% i.e. up to twice that observed for the best reference powder. From these data it is apparent that the decomposition/sublimation of Cu(acac)$_2$ provides the optimal fresh and aged performance without induction period or premature deactivation, Sample D (CuO mixed with SAPO34) also displays high activity, but this is only after aging, again consistent with induction effect c.f. sample B, Conversely the fresh performance of sample E (ion exchange) is competitive with the sublimation method, reflecting an initially optimal interaction between Cu and the framework. However this sample displays a poor aging response consistent with sintering of free Cu species to form bulk CuO resulting in the extensive parasitic oxidation of $NH_3$ to NO, with an onset temperature of ca. 250° C. Similarly sample H, produced by sublimation of copper acetate, shows fair fresh activity but again the aging stability of the powder was insufficient to merit further examination.

The benefits of the sublimation method versus slurry impregnation/calcination are highlighted in FIGS. 9-11. Herein sample F exhibits higher fresh activity for NO and $NH_3$ conversion. It provides a significant improvement in 'light-off' performance with ca. 25% higher NO conversion than the reference at 165° C. Similarly performance in the intermediate temperature range is 5-10% higher while at T≥350° C. NO conversion is equal. These benefits are replicated after the 780° C. aging cycle. Indeed despite the more severe aging of sample F (12 hours vs 2) it retains superior light-off and intermediate temperature range NO and $NH_3$ conversion. The enhanced durability of the sublimation sample is further highlighted in FIG. 11. Thus after the 900° C. air aging cycle the slurry impregnation/calcination sample has undergone catastrophic deactivation with a peak NO conversion of ca. 35% versus >70% for the sample ex sublimation. These performance benefits are reflected in the redox characteristics of sample F (FIGS. 4a/b). Thus fresh sample F shows the preferred bi-modal redox response with the high temperature (500° C.) redox peak ascribed to framework-stabilised Copper. The comparison between the fresh and ex 780° C. aging data shows no shift in the temperature of this peak, in contrast to samples A and B. This indicates that the sublimation synthesis provides the appropriate distribution of Cu in this preferred site directly in the fresh condition whilst conventional synthesis requires further high temperature treatment (induction) i.e. SSIE to attain this preferred most active state. XRD measurements (FIGS. 5a-5c) correlate with performance and TPR data. The fresh sample F shows only reflexions due to SAPO34, although the crystallinity of this sample is higher than samples A and B (stronger, sharper reflexions). After 780° C. sample F maintains a high degree of crystalline response, with only minor traces of Crystobalite present (shoulder at 21.5°). Further aging to 900° C. however results in collapse of the SAPO34 with only trace reflexions evident in a pattern consisting principally of Crystobalite. This collapse is ascribed to de-stabilisation of the long-range order of the SAPO34 by the high Copper content, since based upon activity measurements sufficient active sites are retained to provide catalytic function. Further deactivation trends are seen in surface area data (Table 3). Fresh samples A and F exhibit comparable fresh BET, ca, 40 m²/g higher than sample B, consistent with the issues outlined. However after 780° C. aging while sample F only shows a minor BET loss, both samples A and B exhibit significant decreases, consistent with destabilisation of the framework arising from the sample preparation method i.e. sublimation method allows Cu doping with decreased penalty to framework stability at higher temperatures.

The efficiency of metal exchange afforded by the sublimation method also offers the possibility of decreasing metal dopant levels to improve high temperature durability, without penalty to catalytic function. This possibility is illustrated in FIGS. 12a to 14b. Herein the effectiveness of Cu loads ranging from 1 wt % to 3 wt % is compared as a function of aging. The samples were prepared as outlined in the examples and in all cases the intimate mixture of precursors were calcined in an atmosphere of flowing $N_2$. Fresh NOx conversion traces show a clear benefit for Cu loads ≥2 wt %, with peak NOx conversion of ca. 85%. Similarly near quantitative $NH_3$ conversion for these samples is recorded for all temperatures ≥200° C. The decreased low temperature NOx conversion activity of the 1 and 1.5% Copper is ascribed to lower rates of $NH_3$ conversion, which peak at ca. 88% and ca. 72% for the 1.5 and 1% Cu samples, respectively. After aging at 780° C. there is almost no change in the performance of the higher loaded Cu samples with peak NOx conversion still close to theoretical maximum at the given α. In contrast the 1 and 1.5% Cu samples show significant improvements in performance and now attain 62% and 78% NOx conversion resp. This improvement is ascribed to a Copper mobility effect (induction). After the 900° C. air cycle the performance ranking is seen to change. Hence the 3 wt % Cu sample shows decreased $NH_3$/NOx conversion, due to inherent high temperature reactions between the Cu and the framework. Thus after this more severe aging cycle optimal performance is obtained at 2 or 2.5% Cu with the 1.5% Cu sample now also offering competitive performance. However the key messages herein are that the new synthesis method provides enhanced activity and durability at decreased Cu load and effective materials may be produced by flowing $N_2$ calcination.

The benefits as superior performance at decreased metal load were confirmed by elemental analysis of selected samples from the above data. Thus from Table 4 it may be seen that high performance is obtained at lower Cu contents than typically applied in the prior art. E.g. WO2010-054034 or WO2008-106519 A1,

TABLE 4

| ICP analysis of X % Cu-SAPO34 samples | | | |
|---|---|---|---|
| | 2.5 Cu ex Acac | 2 Cu ex Acac | 1.5 Cu ex Acac |
| wt % Al | 20.40 | 20.40 | 20.60 |
| wt % Si | 4.16 | 4.16 | 4.21 |
| wt % P | 20.10 | 20.00 | 20.10 |
| wt % Cu | 2.27 | 1.83 | 1.37 |
| Moles Al | 0.7561 | 0.7561 | 0.7635 |
| Moles Si | 0.1481 | 0.1481 | 0.1499 |
| Moles P | 0.6490 | 0.6458 | 0.6490 |
| Moles Cu | 0.0357 | 0.0288 | 0.0216 |
| Cu:Al | 0.0472 | 0.0381 | 0.0282 |
| Al:Cu | 21.1646 | 26.2533 | 35.4121 |
| Cu:Si | 0.2412 | 0.1945 | 0.1439 |
| Si:Cu | 4.1454 | 5.1421 | 6.9512 |

As highlighted above an especial benefit of the sublimation is the robustness of the synthesis method. This is reflected in FIGS. 15-17 wherein the impact of the use of different mixing devices to produce the homogeneous salt-framework mixture was investigated. These data confirm high activity of 2% Cu-doped samples produced by three different mixing devices, in all cases superior $NH_3$ and NOx conversion versus the conventional samples at 3%. Moreover the activities of the three samples are within experimental error for fresh, ex 780° C. and ex 900° C. aging cycles. Again peak NOx conversion after the most severe 900° C. cycle is c.a. 80%, a significant improvement on the conventional references. Thus it is apparent that a range of mixing devices may be employed in the process without adverse effect on the final catalyst.

The further demonstration of the robustness of the preparation method and superior thermal durability of samples produced by the sublimation the method is exemplified in FIGS. 18-21. All samples herein were produced as detailed in examples with final calcination in static air. The data is unsurprising; all samples exhibit activity and stability trends almost identical to that seen in 12a-14b. Thus fresh NOx conversions exceed 85% and the samples display a broad window of high activity with low parasitic $NH_3$ oxidation/NOx formation, Performance after 780° C. aging shows low to no change, save the improvements seen for the 1 and 1.5% Cu doped samples seen in FIGS. 12a/13a. FIG. 20 confirms the durability deficiency of the 3% Cu sample after 900° C. air aging, which shows the onset of solid state reactions between the Copper dopant and the framework. These tendencies are even more apparent after aging at 950° C. in air, with both the 3 and 2.5% Cu samples exhibiting near complete deactivation. In contrast the 1.5% Cu sample still possesses high activity with a peak NOx conversion close to 80%. These data suggest that the flexibility of the sublimation method may offer the opportunity to tailor metal dopant levels, as required in the application e.g. the use of lower Cu content Zeotype in an SDPF (SCR washcoated particulate filter), either as a homogeneous washcoat or as a zone in the DPF. The use of a zone of lower Cu load material with increased durability and high activity after severe filter regeneration aging is especially interesting given peak DPF temperatures during regeneration.

Further examples of the durability, in this instance in the presence of air and steam (10%) at 750 and 900° C., can be found in FIGS. 22 and 23. Herein comparison is made between air and $N_2$ calcined samples at varying Cu content. After aging for 16 h at 750° C. in air+10% steam all samples retain excellent activity with peak NOx conversions of ca. 80%. No difference is seen between samples calcined in air vs $N_2$ at either 2 or 2.5% Cu and there is only a small penalty in performance noted for the sample loaded with 1.5% Cu. This is not the case after aging for 4 h at 900° C. in air/steam. Herein the both 2.5% Cu samples show near identical performance and catastrophic deactivation. Similarly the activity of the 2% Cu samples is comparable but very poor. In contrast the 1.5% Cu sample retains acceptable performance with a peak NOx conversion of ca. 57% after this harsh aging. It should be stressed these data rather reflect a fundamental instability due to high temperature solid state reactions between the Cu and the Zeotype framework rather than a weakness in the new synthetic method e.g. c.f. FIGS. 3 and 11, Consistent with this hypothesis better activity is retained at lower Copper load, consistent also with FIGS. 14a/b and 20.

The application of the sublimation method for the introduction of other metal species and with other framework structures is demonstrated in FIGS. 24 and 25, respectively. Thus in FIG. 24 the activity of de-greened Iron promoted Zeolites (2.5 wt % Fe), specifically ZSM5 (SAR 23) and Zeolite β (SAR 38), prepared by either conventional impregnation or sublimation method. Herein while all samples display activity for the SCR process, requiring higher temperatures than noted for Cu-based samples consistent with prior art e.g. WO2008/132452 A2, it is apparent that for a given framework structure the activity is significantly higher for the samples prepared by the sublimation method than that obtained by the conventional impregnation process, a further confirmation of the benefits of the new method. Moreover the sublimation method may also be applied advantageously to the preparation of other standard Copper promoted Zeolite systems. This is reflected in FIG. 25 wherein the de-greened activity of 2 and 4 wt % Copper promoted ZSM5 and β samples, prepared by sublimation of $Cu(acac)_2$ following the standard method, is reported. Again all samples exhibit high activity and attain stoichiometric, or close to stoichiometric, conversion of NO with the available $NH_3$ in the feedstream.

The present invention relates to the development and use of an improved method for the production of metal doped/metal exchanged Zeolites/Zeotypes and their application to the remediation of NOx from internal combustion engines via the process of Selective Catalytic Reduction (SCR) employing a post-injected N-bearing reductant. The method is further characterised in that it employs a dry i.e. non aqueous (or other solvent based) process in which the metal ions are introduced into the framework material by a sublimation/decomposition of an appropriate metal precursor e.g. diketonate, specific Carbonyl complexes or similar as part of an intimate mixture of a precursor compound and Zeolites/Zeotypes. The process is yet further characterised by its robust nature in that it does not require specific reactive gas environment and reduced pressure. It provides for the formation of the desired metal doped framework material, which is also a part of the present invention, without the generation of significant harmful or toxic waste by-products.

Benefits and features include:
a) Simplicity: the process comprises a mixing of two dry powders followed by high temperature treatment. There is no need for complex mixing units or slurry handling systems. The dry process obviates any requirement for slurry filtration, washing or drying. Moreover the process is insensitive with regard to the atmosphere or reactor pressure used during calcination. This is an advantage over the prior art in that neither a protective nor a reductive gas has to be applied.
b) Cost: Material savings arise from the simplicity of the synthesis without recourse to the equipment and process described in a). Further savings arise from the removal of monitoring equipment of slurry pH and temperature etc.
c) Time: production of the finished powder can be complete in as a little as 2 hours unlike the multiple-clay requirements of conventional wet exchange or the many hour requirements of slurry impregnation/calcination (mixing time to ensure homogeneity, limit contribution of exotherm of wetting of Zeolite/Zeotype on slurry chemistry etc.).
d) Decreased Environmental Impact: Unlike the processes of the prior art the current process limits by-product generation to stoichiometric quantities of $CO_2$ from decomposition of the precursor ligands. There is no generation of extensive aqueous waste streams, as with ion exchange, nor the generation of potentially toxic emissions e.g. HF or HCl gas as seen for SSIE or N-bearing compounds (organic amines or Nitrogen oxides) as noted for the slurry impregnation/calcination method (from combustion of $NH_3$ or organo-nitrogen bases used in slurry pH control/metal precipitation). Moreover given the stoichiometric nature of the preparation there is no excess material or additional chemicals required to produce the catalyst, decreasing the environmental impact to a minimum.
e) More robust and flexible method for dopant introduction: Dopant targeting requires simple calculation for loss of ignition of precursor materials. The absence of any additional chemical species or processes decreases any stacked tolerances to the absolute minimum.
f) Performance benefits: Unlike the conventional slurry impregnation/calcination process the sublimation method introduces the metal directly to the specific active exchange centre of the Zeolite/Zeotype. Thus no induction period is observed. In addition given the increased efficiency of metal doping by the sublimation method there is no need to 'overload' the Zeolite/Zeotype to obtain the 'full' metal doping required for the optimal performance. This provides an improvement in catalyst selectivity i.e. decreased parasitic $NH_3$ oxidation, as may arise from the formation of a catalytically active phase e.g. CuO (Tenorite), discrete or detectable by conventional X-Ray diffraction method, Secondly improved durability/aging stability of metal containing framework material is realised as the decreased metal load limits high temperature (>750° C.) solid state reactions between the dopant and the framework, a primary cause of phase collapse and formation of catalytically inactive new phases during/after aging, Finally the dry sublimation process removes the need for slurry pH or rheology modifiers e.g. $HNO_3$ or TEAH. The use of both classes of these modifiers, acidic or basic, is problematic as both species may react with the Zeolite or Zeotype and extract framework atoms thereby de-stabilising the structure. Such damage is not detectable in the fresh powders but is known to have adverse consequences for high temperature durability.

Definitions:

It should be further noted that the terms "first", "second" and the like herein do not denote any order of importance, but rather Are used to distinguish one element from another, and the terms "a" and "an" herein do not denote a limitation of quantity, but rather denote the presence of at least one of the referenced items. Furthermore, all ranges disclosed herein are inclusive and combinable e.g., ranges of "up to about 25 weight percent (wt %), with about 5 wt % to about 20 wt % desired, and about 10 wt % to about 15 wt % more desired" is inclusive of the endpoints and all intermediate values of the ranges, e.g. "about 5 wt % to about 25 wt %, about 5 wt % to about 15 wt %" etc.

Zeolite: Zeolites are microporous crystalline aluminosilicate materials characterised by well ordered 3-D structures with uniform pore/channel/cage structures of 3 to 10 Å (depending on framework type) and the ability to undergo ion exchange to enable the dispersion of catalytically active cations throughout the structure.

Zeotype: Zeotypes are structural isotypes/isomorphs of Zeolites but instead of a framework structure derived of linked Silica and Alumina tetrahedra they are based upon for example: alumina-phosphate (ALPO), silica-alumina-phosphate (SAPO), metal-alumina-phosphate (Me-ALPO) or metal-silica-alumina-phosphate (MeAPSO).

Zeolytic material is a material based upon the structural formalisms of Zeolites or Zeotypes, Diketonate-structured ligands: Implying a ligand i.e. an ion or molecule that binds to a central metal-atom forming a coordination complex that possesses two sets of chemical functionality exhibiting Keto-Enol forms. Herein Keto i.e. Ketone/Aldehyde (carbonyl or C=O bearing hydrocarbon)-Enol (unsaturated alcohol i.e. C=C—OH) forms are derived from organic chemistry. A key characteristic of Keto Enol systems is they exhibit a property known as tautomerism which refers to a chemical equilibrium between a Keto form and an Enol involving the interconversion of the two forms via proton transfer and the shifting of bonding electrons.

The above-described catalyst and process and other features will be appreciated and understood by those skilled in the art from the following detailed description, drawings, and appended claims.

EXAMPLES

Comparative Reference Sample A:

150 g of H$^+$ form SAPO34 was added, with constant stirring, to 480 ml de-ionised water to produce slurry with a solids content of 24%. This addition results in an exotherm within the slurry, requiring care to be taken during this step. The slurry was stirred continuously for a minimum of 30 minutes to allow dissipation of the exotherm of wetting of the Zeotype. Next 17.1 g of $Cu(NO_3)_3.3H_2O$ crystals were dissolved under vigorous stirring in 30 g of de-ionised water. The solution thus produced was added dropwise to the vortex of the slurry over 15 minutes. In order to facilitate the alkaline (pH>7) precipitation of Copper the resultant slurry, with a pH of c.a. 4, was treated by dropwise addition of 48 g of tetra-ethyl ammonium hydroxide solution (35% by weight TEAH), following the method of U.S. Pat. No. 5,908,806 to reach an endpoint pH of 7-8. The sample was stirred for a further 60 minutes prior to drying 20 hours at 65° C. in air and then calcination for 2 hours at 500° C. in air. The resultant powder was meshed as per Table 1 and tested without further modification.

Comparative Reference Sample B:

150 g of H$^+$ form SAPO34 was added, with constant stirring, to 240 ml de-ionised water to produce a slurry (38.5% solids). As this addition resulted in a significant exotherm, care was taken during this step and the slurry was stirred continuously for a minimum of 30 minutes to dissipate this exotherm. Next 17.1 g of $Cu(NO_3)_3.3H_2O$ crystals were added to the vortex of the slurry over 1 minute to produce a slurry with a pH of 4. Again precipitation of was achieved by dropwise addition of 48 g of tetra-ethyl ammonium hydroxide solution (35% by weight TEAH), to reach an endpoint pH of 7-8 The slurry produced by this addition was extremely viscous and difficult to mix. The sample was stirred for a further 60 minutes prior to drying 20 hours at 65° C. in air and then calcination for 2 hours at 500° C. in air. The resultant powder was meshed as listed in Table 1 and tested without further modification.

Preparation Procedure for ca. 100 g of 3 Wt % Cu on SAPO34 Powder by Sublimation/Solid Mixing (Sample F):

12.2 g of Copper Acetylacetonate (24.4% by weight Cu, ex Alrdich) was coarsely mixed with 100 g of SAPO34 in a sealable plastic bottle of 250 mL capacity. Next 10 g Y-stabilised $ZrO_2$ beads, (5 mm diameter), were added. The bottle was sealed and locked into a paint shaker (Olbrich Model RM 500, 0.55 KW) and homogenised by vibration for 5 minutes. The bottle was then unlocked from the paint shaker and the mixture passed through a coarse sieve to remove the beads, Finally the mixed powders were transferred to a calcination vessel and heated in static air (or alternatively flowing $N_2$) to 350° C. (at a ramp rate of 5° C./min) and for a period of 2 hours to produce the active catalyst powder which was meshed and tested as per Table 1.

Preparation Procedure for 3 Wt % Cu or a SAPO34 Powders by Solid Mixing Employing CuO as Cu Precursor (Sample C):

This material was prepared following the method described above, with the exception that the mixture comprised 0.194 g of CuO (which is 79.88% by weight Cu) and 5 g of H-SAPO34 and the material was not calcined after the intimate mixture was produced.

Preparation Procedure for 3 Wt % Cu on SAPO34 Powders by Solid Mixing and Calcination Employing CuO as Cu Precursor (Sample D):

This material was prepared following the method described above, with the exception that the mixture comprised 0.194 g of CuO (which is 79.88% by weight Cu) and 5 g of H-SAPO34. After mixing the bottle was then unlocked from the paint shaker and the mixture and mill media passed through a coarse sieve to remove the beads. Finally the mixed powders were transferred to a calcination vessel and heated in static air to 350° C. (at a ramp rate of 5° C./min) and for a period of 2 hours to produce the active catalyst powder.

Comparative Reference E: 3% Cu-SAPO34 ex Aqueous Ion Exchange:

150 g of H$^+$ form SAPO34 was added, under constant stirring, to 200 ml (i.e. 200 g) de-ionised water to produce slurry with a solid content of 42.8%, Again specific care was taken during this step to limit the exotherm generated from powder wetting. The slurry was then further stirred continuously for a minimum of 30 minutes to allow dissipation of the exotherm, Next 14.0 g of Cu II Acetate (which is 32% by weight Cu) were dissolved under vigorous stirring in 400 g of de-ionised water. The solution thus produced by added dropwise to the vortex of the Zeotype slurry over 15 minutes. The obtained mixture was stirred overnight prior to drying 10 hours at 110° C. in air and then calcination for 2 hours at 500°

C. in air. The resultant powder was meshed as per Table 1 and tested without further modification.

Preparation Procedure for ca. 100 g of 3 Wt % Cu Ort SAPO34 Powders by Solid Mixing/Sublimation Employing Copper Oxalate as Cu Precursor (Comparative Reference Sample G):

Prepared following the method described above, with the exception that the mixture comprised 7.5 g of Cu II Oxalate (which is 39.8% by weight Cu) and 100 g of H-SAPO34.

Preparation procedure for ca. 100 g of 3 wt % Cu on SAPO34 powders by solid mixing/sublimation employing Copper Acetate as Cu precursor (Comparative reference Sample H):

Prepared following the method described above, with the exception that the mixture comprised 9.3 g of Cu II Acetate (which is 32% by weight Cu) and 100 g of H-SAPO34.

Preparation Procedure for ca. 100 g of 2.5 Wt % Cu on SAPO34 Powders Employing Copper Acetylacetonate as Precursor by Solid Mixing/Sublimation:

Prepared following the method described above, with the exception that the mixture comprised 10.1 g of Cu II acetylacetonate and 100 g of H-SAPO34.

Preparation Procedure for ca. 100 g of 2 Wt % Cu on SAPO34 Powders Employing Copper Acetylacetonate as Precursor by Solid Mixing/Sublimation:

Prepared following the method described above, with the exception that the mixture comprised 8.07 g of Cu II acetylacetonate and 100 g of H-SAPO34.

Preparation Procedure for ca. 100 g of 1.5 Wt % Cu on SAPO34 Powders Employing Copper Acetylacetonate as Precursor by Solid Mixing/Sublimation:

Prepared following the method described above, with the exception that the mixture comprised 6.0 g of Cu II acetylacetonate and 100 g of H-SAPO34.

Preparation Procedure for ca. 100 g of 1 Wt % Cu on SAPO34 Powders Employing Copper Acetylacetonate as Precursor by Solid Mixing/Sublimation:

Prepared following the method described above, with the exception that the mixture comprised 4.0 g of Cu II acetylacetonate and 100 g of H-SAPO34.

Preparation Procedure for ca. 100 g of 2 Wt % Cu or a SAPO34 Powders Employing Copper Acetylacetonate as Precursor by Solid Mixing/Sublimation Employing a Coffee Mill as the Mixing Device (Sample J):

This material was prepared as described above, with the exception that the mixture was finely homogenised using a scalable coffee mill device (IKA, Model: M20 Universal mill) for 5 minutes prior to calcination.

Preparation Procedure for ca. 100 g of 2 Wt % Cu or a SAPO34 Powders Employing Copper Acetylacetonate as Precursor by Solid Mixing/Sublimation Employing a Over-Head Stirrer Unit as the Mixing Device (Sample K):

This material was prepared as described above, with the exception that the mixture was finely homogenised in an open beaker using a hear shear overhead mixer device (HiTEC-Zang, Model: MiscoPakt@-mini-35) for 5 minutes prior to calcination.

Preparation Procedure for ca. 120 g of 2.5 Wt % Fe Ort ZSM5 Powder by Solid Mixing/Sublimation Employing Iron Acetylacetonate as Fe Precursor:

Prepared following the method described above for Cu/SAPO34, with the exception that the mixture comprised 15.8 g of Fe III acetylacetonate and 109 g of ZSM5.

Preparation Procedure for ca. 120 g of 2.5 Wt % Fe on Zeolite β Powder by Solid Mixing/Sublimation Employing Iron Acetylacetonate as Fe Precursor:

Prepared following the method described above for Cu/SAPO34, with the exception that the mixture comprised 15.8 g of Fe III acetylacetonate and 114 g of Zeolite β.

Preparation Procedure for Comparative Reference Sample $Fe(NO_3)_3$ ZSM5-$NH_4^+$ (2.5 wt % Fe):

218 g of $NH_4^+$ form ZSM5 was added, with constant stirring, to 800 ml de-ionised water to produce slurry with a solids content of 20%. The slurry was stirred continuously for a minimum of 60 minutes to allow dissipation of the exotherm of wetting of the Zeotype. Next 36.2 g of $Fe(NO_3)_3.3H_2O$ crystals were dissolved under vigorous stirring in 100 g of de-ionised water. The solution thus produced was added dropwise to the vortex of the slurry over 15 minutes and further kept stirring for 24 h. Then the slurry was dried 24 hours at 65° C. in air and then calcination for 2 hours at 500° C. in air. The resultant powder was meshed as per Table 1 and tested without further modification.

Comparative Reference Sample $Fe(NO_3)_3$ Zeolite β (2.5 Wt % Fe):

Prepared following the method described above, with the exception that the $NH_4^+$ form of Zeolite β was employed.

Preparation Procedure for ca. 120 g of 2 Wt % Cu on ZSM5 Powders by Solid Mixing/Sublimation Employing Copper Acetylacetonate as Cu Precursor:

Prepared following the method described above for Cu/SAPO34, with the exception that the mixture comprised 8.25 g of Cu II acetylacetonate and 115 g of ZSM5.

Preparation Procedure for ca. 120 g of 2 Wt % Cu on Zeolite β Powder by Solid Mixing/sublimation employing Copper Acetylacetonate as Cu precursor:

Prepared following the method described above for Cu/SAPO34, with the exception that the mixture comprised 8.25 g of Cu II acetylacetonate and 115 g of Zeolite β.

The invention claimed is:

1. Process for the production of metal doped Zeolites or Zeotypes comprising the steps of:
   i) providing a dry intimate mixture of a Zeolite or Zeotype with one or more precursor compound or compounds comprising a complex formed out of a transition metal and a ligand, which has a structure of formula I:

$$ML^1{}_m L^2{}_n \quad \text{(I)}$$

wherein:
   M is a metal selected from the group consisting of V, Cr, Mn, Fe, Co, Ni, Cu, Nb, Mo, Ru, Rh, Pd, Ag, and Ce; and
   $L^1$ is carbonyl, amine, alkyl, alkoxy, alkene, arene, phosphine or other neutral coordinating ligand;
   m is a number ranging from 0 to 6;
   n is a number equal to the valence of M; and
   $L^2$ is a diketonate, ketoiminato or related member of this homologous series like a ligand of formula II:

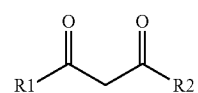

(II)

wherein:
   R1 and R2 are independently alkyl, substituted alkyl, aryl, substituted aryl, acyl and substituted acyl; and
   ii) calcining the mixture without reduced pressure at a temperature and a time sufficient to mobilise and decompose the precursor compound; and
   iii) obtaining the metal-doped Zeolite or Zeotype.

2. Process according to claim 1, wherein the Zeolite or Zeotype is selected from the group consisting of one or a mixture of Faujasite type, Pentasil type, or Chabazite type Zeolite or Zeotype.

3. Process according to claim 1, wherein the metal is selected from the group consisting of Fe, Cu, Co, Ag, and Ce.

4. Process according to claim 1, wherein the complex ligand is selected from one or a mixture of the group comprising a diketonate-structure and carbonyl species.

5. Process according to claim 1, wherein the mixture is calcined at a temperature of ≥200° C.-650° C.

6. Process according to claim 1, wherein the mixture is calcined at a temperature of 350-450° C. for 1-5 hours.

7. Process according claim 1, wherein the mixture comprises the Zeolite or Zeotype material and the precursor compound to provide a subsequent metal dopant loading of 0.01 wt % metal to 10 wt % metal.

8. A material or mixture of materials produced according to claim 1.

9. A catalyst comprising the material or mixture of materials according to claim 8, wherein the catalyst comprises an inert refractory binder selected from the group consisting of alumina, titania, non-Zeolitic silica-alumina, silica, zirconia and mixtures thereof coated on a flow through ceramic monolith, metal substrate foam or on a wall-flow filter substrate.

10. A catalyst according to claim 9, wherein the material or mixture of materials and the binder are coated in discrete zones on a flow through ceramic monolith, metal substrate foam or on a wall-flow filter substrate.

11. A monolith catalyst formed via extrusion of the material or mixture of materials of claim 8.

12. A method of selective catalytic reduction of oxides of Nitrogen comprising contacting the oxides of Nitrogen with a catalyst or monolith catalyst of claim 9 for the selective catalytic reduction of oxides of Nitrogen.

13. The method according to claim 12, wherein the nitrogen-containing reductant is introduced to give an effective $NH_3:NO_x$-ratio ($\alpha$ ratio) at the catalyst inlet of 0.5 to 2.

14. The method according to claim 12, wherein the $NO:NO_2$ ratio recorded at the inlet of the catalyst is from 1:0 to 1:3 by volume.

15. A method of selective catalytic reduction of nitrogen oxide comprising contacting the nitrogen oxide with the metal doped Zeolite or Zeotype of claim 1.

16. The method of claim 15 wherein the contacted Zeolite or Zeotype is a Zeotype with a SAPO framestructure and a metal loading of 1 to 2.5 wt % metal.

17. A catalyst, comprising: the metal doped Zeolite or Zeotype of claim 1, wherein the Zeolite or Zeotype is a Zeotype with a SAPO framestructure and the metal loaded Zeotype has a metal dopant loading of 1 to 2.5 wt % metal.

18. The process of claim 1 wherein the one or more precursor compound or compounds comprises a metal acetylacetonate such that the metal acetylacetonate is part of the dry intimate mixture subject to the calcining.

19. The process according to claim 1 wherein the Zeolite or Zeotype is selected from the group consisting of one or a mixture of SAPO-34 or other '8 ring' structure of the structure type CHA, AEI, AFT, AFX, DDR, ERI, ITE, ITW, KFI, LEV, LTA, PAU, RHO, and UFI.

20. The process according to claim 1 wherein the Zeolite or Zeotype provided is SAPO-34, and the one or more precursor compound or compounds provided in the dry intimate mixture includes a copper acetylacetonate compound such that the calcining of the dry intimate mixture is carried out with SAPO-34 and copper acetylacetonate in the dry intimate mixture.

\* \* \* \* \*